(12) United States Patent
Mou et al.

(10) Patent No.: US 12,442,550 B2
(45) Date of Patent: Oct. 14, 2025

(54) METHOD FOR DETECTING, LOCATING AND COMPLETELY CLEANING INDOOR MICROORGANISM

(71) Applicant: Microjet Technology Co., Ltd., Hsinchu (TW)

(72) Inventors: Hao-Jan Mou, Hsinchu (TW); Chin-Chuan Wu, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 646 days.

(21) Appl. No.: 17/878,260

(22) Filed: Aug. 1, 2022

(65) Prior Publication Data

US 2024/0035691 A1    Feb. 1, 2024

(30) Foreign Application Priority Data

Jul. 28, 2022 (TW) .................................. 111128402

(51) Int. Cl.
*F24F 11/30* (2018.01)
*B01D 46/00* (2022.01)
(Continued)

(52) U.S. Cl.
CPC ................ *F24F 8/22* (2021.01); *B01D 46/00* (2013.01); *F24F 8/108* (2021.01); *F24F 8/158* (2021.01);
(Continued)

(58) Field of Classification Search
CPC ...... B01D 46/00; B01D 46/442; B01D 53/34; F24F 11/30; F24F 11/32
See application file for complete search history.

(56) References Cited

U.S. PATENT DOCUMENTS 9,539,532 B2 *    1/2017    Fox .......................... B01J 20/18
10,092,873 B2    10/2018    Jung et al.
(Continued)

FOREIGN PATENT DOCUMENTS

CN    208296153 U    * 12/2018
CN    111336656 A    6/2020
(Continued)

OTHER PUBLICATIONS

Extended European Search Report for European Application No. 22189803.4, dated Aug. 11, 2023.

*Primary Examiner* — Robert A Hopkins
(74) *Attorney, Agent, or Firm* — Birch, Stewart, Kolasch & Birch, LLP

(57) ABSTRACT

A method for detecting, locating and completely cleaning indoor microorganism is disclosed. At least one gas pump is widely disposed in an indoor space to provide an airflow to inhale air thereinto at any time, and collect at least one microorganism contained in the air at any time. The airflow is utilized to transport the microorganism to at least one physical first device and/or chemical first device and/or microbial first device for detecting and locating a concentration, a species or a size of the microorganism. Artificial intelligence operations are implemented through a wireless network to determine the location of the microorganism. At least one fan closest to the location of the microorganism is intelligently selected and enabled to generate a directional air convection, so that the microorganism is transported to at least one physical second device and/or chemical second device and/or microbial second device for elimination and complete clearance.

26 Claims, 25 Drawing Sheets

(51) Int. Cl.
*F24F 8/108* (2021.01)
*F24F 8/158* (2021.01)
*F24F 8/167* (2021.01)
*F24F 8/22* (2021.01)
*F24F 11/32* (2018.01)
*F24F 110/65* (2018.01)

(52) U.S. Cl.
CPC ............. *F24F 8/167* (2021.01); *F24F 11/30* (2018.01); *F24F 11/32* (2018.01); *F24F 2110/65* (2018.01)

(56) References Cited

U.S. PATENT DOCUMENTS

| | | |
|---|---|---|
| 11,609,008 B2 * | 3/2023 | Lin ................. G08B 21/12 |
| 2022/0099671 A1 | 3/2022 | Goldberg et al. |

FOREIGN PATENT DOCUMENTS

| | | |
|---|---|---|
| CN | 111692661 A | 9/2020 |
| CN | 112944543 A | 6/2021 |
| CN | 114440383 A | 5/2022 |
| JP | 51-90595 U | 7/1976 |
| JP | 2004-159636 A | 6/2004 |
| JP | 4273678 B2 | 6/2009 |
| JP | 2016-183808 A | 10/2016 |
| JP | 2019-35575 A | 3/2019 |
| JP | 2020-199149 A | 12/2020 |
| JP | 2022-98449 A | 7/2022 |
| TW | M522384 U | 5/2016 |
| TW | M609703 U | 4/2021 |
| TW | 202224750 A | 7/2022 |
| WO | WO 2016/017950 A1 | 2/2016 |

* cited by examiner

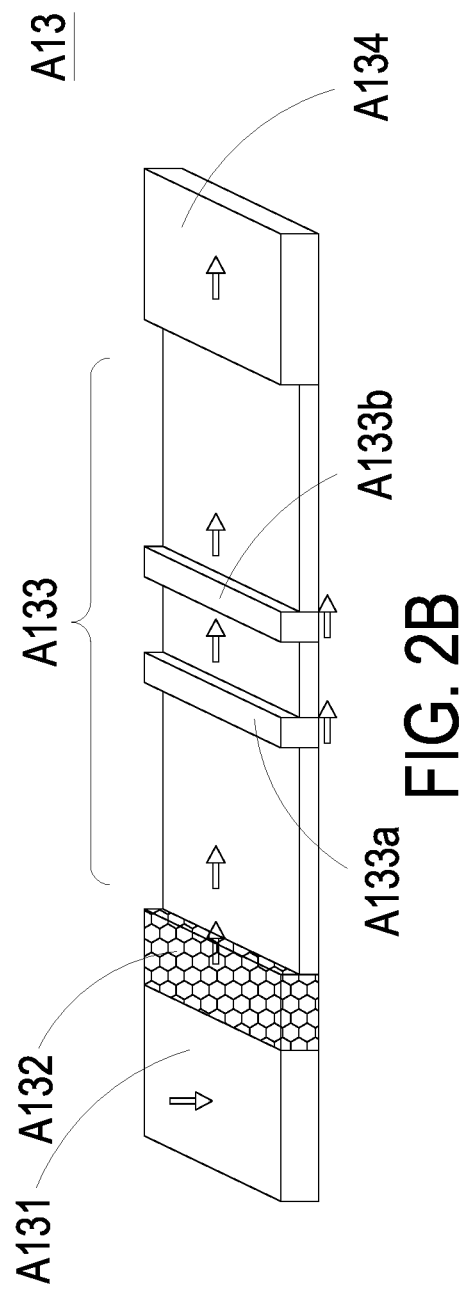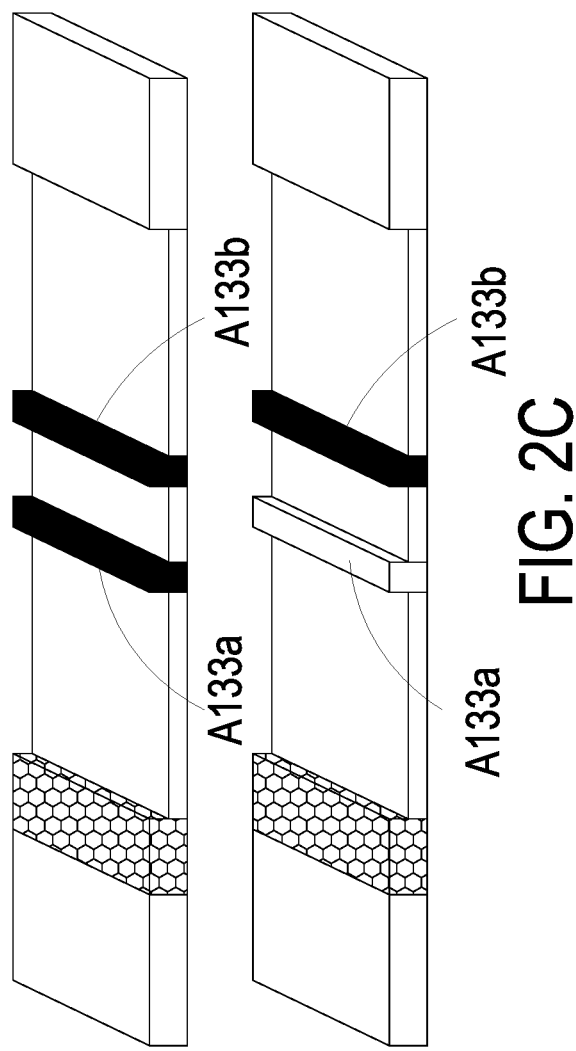

METHOD FOR DETECTING, LOCATING AND COMPLETELY CLEANING INDOOR MICROORGANISM

FIELD OF THE INVENTION

The present disclosure relates to a method for detecting, locating and completely cleaning indoor microorganism, and more particularly to a method for detecting, locating and completely cleaning indoor microorganism including one of bacteria, fungi and virus.

BACKGROUND OF THE INVENTION

In recent years, people pay more and more attention to the air quality around their living environment. Particulate matter (PM), such as $PM_1$, $PM_{2.5}$ and $PM_{10}$, carbon monoxide, carbon dioxide, total volatile organic compounds (TVOC), formaldehyde and even suspended particles, aerosols, bacteria and viruses contained in the air and exposed in the environment might affect human health, and even endanger people's life.

However, it is not easy to control the indoor air quality. In addition to the air quality of the outdoor space, the air environmental conditions and pollution sources, especially the microorganism including one of bacteria, fungi and virus originated from poor air circulation in the indoor space, are the major factors that affect indoor air quality. In order to quickly improve the indoor air quality, several devices, such as air conditioners or air purifiers are utilized to achieve the purpose of improving the indoor air quality.

Therefore, in order to intelligently and quickly detect the location of the indoor microorganism contained in the air, effectively remove the indoor microorganism contained in the air to form a clean and safe breathing air state, instantly monitor the indoor air quality, and quickly purify the indoor air when the microorganism is contained in the air, it becomes important to find a solution to intelligently generate an airflow convection in the indoor space, quickly detect and locate the microorganism contained in the air, and effectively control plural physical and/or chemical filtration devices to implement an intelligent airflow convection to accelerate airflow in the desired direction(s), and filter and remove the microorganism in the indoor space by locating the microorganism, draining the microorganism and completely cleaning the microorganism in the indoor space so as to achieve a clean and safe breathing air state.

SUMMARY OF THE INVENTION

One object of the present disclosure is to provide a method for detecting, locating and completely cleaning indoor microorganism. By widely disposing at least one gas pump in an indoor space, an airflow is provided to inhale air thereinto at any time, and collect at least one microorganism contained in the air at any time. The at least one microorganism is transported by the airflow to at least one physical first device and/or chemical first device and/or microbial first device for detecting and locating a concentration, a species or a size of the at least one microorganism. Moreover, artificial intelligence operations are implemented through a wireless network to determine the location of the at least one microorganism, and at least one fan closest to the location of the at least one microorganism is intelligently selected and enabled to generate a directional air convection, so that the at least one microorganism is transported to at least one of physical second device and/or chemical second device and/or microbial second device for elimination and complete clearance. As a result, the effects of microorganism-locating, microorganism-draining and microorganism-completely-cleaning are achieved.

In accordance with an aspect of the present disclosure, a method for detecting, locating and completely cleaning indoor microorganism is provided. At least one gas pump is widely disposed in an indoor space to provide an airflow to inhale air thereinto at any time, and collect at least one microorganism contained in the air at any time. The airflow is utilized to transport the at least one microorganism to at least one physical first device and/or chemical first device and/or microbial first device for detecting and locating a concentration, a species or a size of the at least one microorganism. Artificial intelligence operations are implemented through a wireless network to determine the location of the at least one microorganism. At least one fan closest to the location of the at least one microorganism to generate a directional air convection, so that the at least one microorganism is transported to at least one physical second device and/or chemical second device and/or microbial second device for elimination and complete clearance.

BRIEF DESCRIPTION OF THE DRAWINGS

The above contents of the present disclosure will become more readily apparent to those ordinarily skilled in the art after reviewing the following detailed description and accompanying drawings, in which:

FIG. 2B is a schematic view illustrating the detection carrier according to the embodiment of the present disclosure;

FIG. 2C is a schematic view illustrating the color change of the test line and the control line on the nitrocellulose membrane of the detection carrier according to the embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
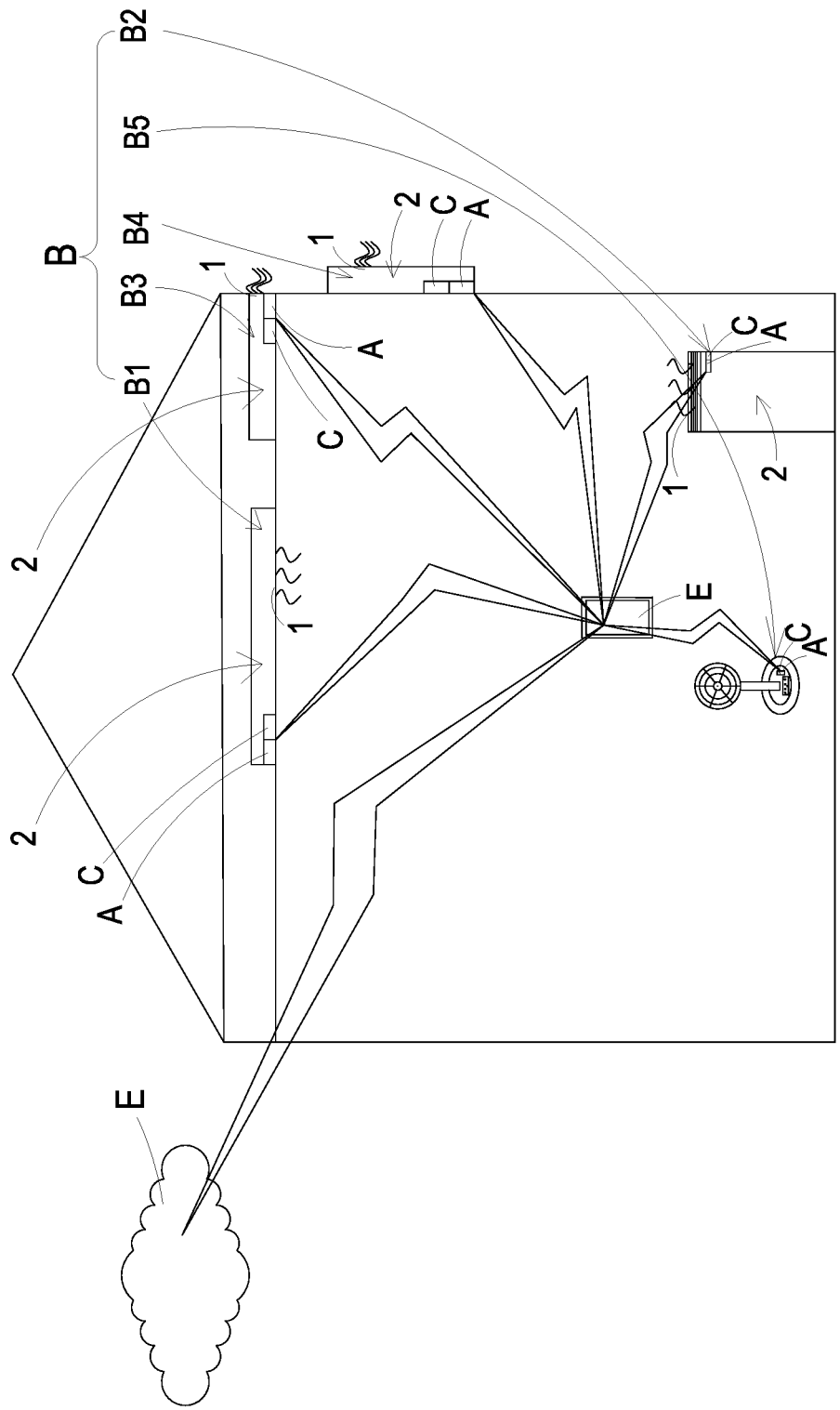
FIG. 1A is a schematic view illustrating a method implemented in an indoor space for detecting, locating and completely cleaning indoor microorganism according to an embodiment of the present disclosure.
Figure 1B:
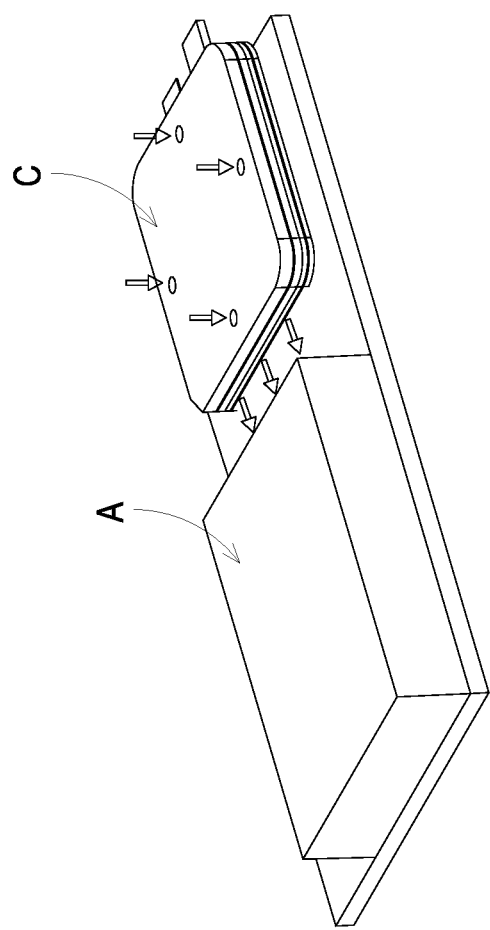
FIG. 1B is a schematic view illustrating the gas pump generating an airflow transported to the physical first device and/or the chemical first device for collecting the microorganism contained in the air according to the embodiment of the present disclosure.

Please refer to FIGS. 1A and 1B. The present disclosure provides a method for detecting, locating and completely cleaning indoor microorganism. In the embodiment, at least one gas pump C is widely disposed in an indoor space to provide an airflow to inhale air thereinto at any time, and collect at least one microorganism contained in the air at any time. The airflow is utilized to transport the at least one microorganism to at least one physical first device A and/or chemical first device A and/or microbial first device A for detecting and locating a concentration, a species or a size of the at least one microorganism. Artificial intelligence operations are implemented through a wireless network to determine the location of the at least one microorganism, and at least one fan 1 closest to the location of the at least one microorganism is selectively enabled according to the artificial intelligence operations to generate a directional air convection, so that the at least one microorganism is transported to at least one physical second device B and/or chemical second device B and/or microbial second device B for elimination and complete clearance.

Notably, in the embodiment, the microorganism is at least one selected from the group consisting of bacteria, fungi, virus and a combination thereof. In the embodiment, the gas pump C is a miniaturized piezoelectric pump, which provides an airflow to inhale the air thereinto at any time and collect the at least one microorganism in the air at any time. In the embodiment, the airflow is utilized to transport the at least one microorganism to the at least one physical first device A and/or chemical first device A or microbial first device A.

In the embodiment, the at least one physical first device A and/or chemical first device A and/or microbial first device A is a microbial detection device 3. Preferably but not exclusively, the physical first device A is a microbial detection device 3 implementing detection through a sensor. Preferably but not exclusively, the chemical first device A is a microbial detection device 3 implementing detection through a chemical element material directly. Preferably but not exclusively, the microbial first device is a microbial detection device that detects a stimulus response of a microbial or a microbial material to a foreign compound. In the embodiment, the microbial detection device 3 can detect the concentration, the species or the size of the at least one microorganism, and microorganism data detected by the microbial detection device 3 is transmitted externally through a wireless network.

Figure 2A:
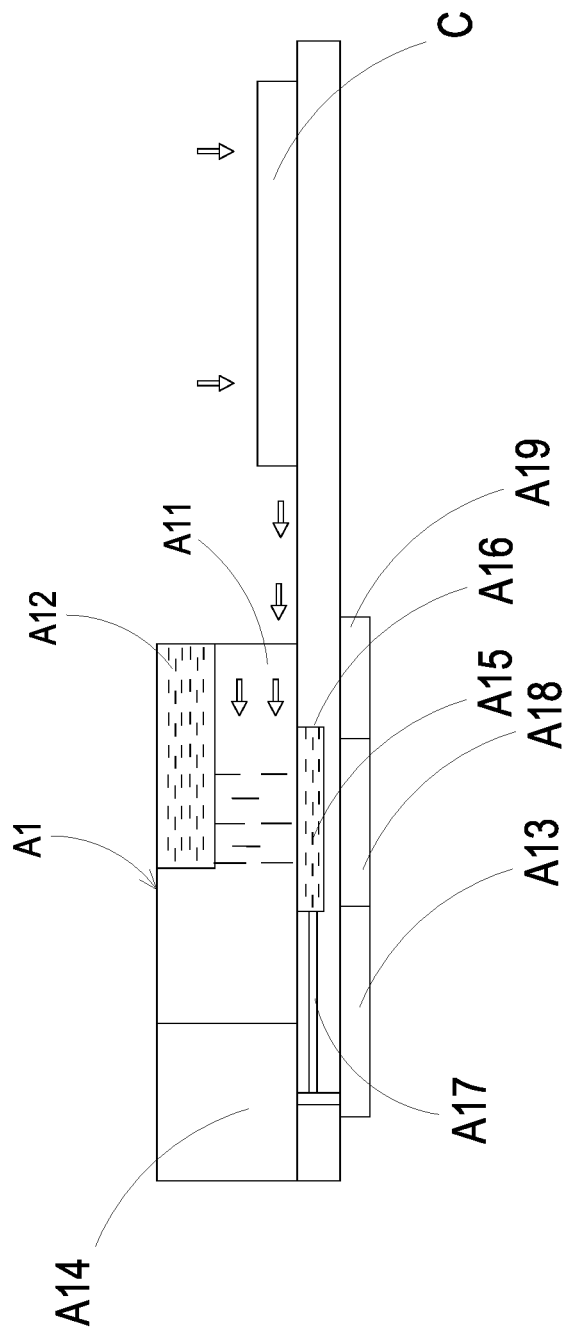
FIG. 2A is a schematic view illustrating the microbial first device for detecting the microorganism according to the embodiment of the present disclosure.

In an embodiment, as shown in FIG. 2A and FIG. 2B, the microbial first device A is a microbial detection device 3. The microbial detection device 3 includes a detection chamber A1. The detection chamber A1 has a channel A11, and a gas is introduced into the channel by gas pump C. The detection chamber A1 includes an antigen test agent A12, a detection carrier A13 and a liquid guider A14. The antigen test agent A12 set in the detection chamber A1 is sprayed on the gas introduced in the channel A11 for mixing and precipitating to form a sample A15 in the liquid state. The sample A15 is collected in a storage vessel A16 for determining an identifiable protein on the virus. Preferably but not exclusively, the sample A15 is collected and drained to a pipeline A17 by the liquid guider A14, and then the sample A15 in the storage dish A16 is introduced to the detection carrier A13 to form an interactive reaction for determining the presence of virus in the microorganism, so as to determine whether the air in the indoor space contains the virus. Moreover, a microbial chip A18 is utilized to detect the sample A15 passing through the detection carrier A13, so as to determine the concentration, the species or the size of the virus of the microorganism. The virus data of the microorganism detected is transmitted externally by the communicator A19 through a wireless network.

Please refer to FIG. 2B. In the embodiment, the detection carrier A13 includes a sample layer A131, an antibody layer A132, a nitrocellulose membrane A133 and an absorption layer A134 arranged laterally in sequence. When the sample A15 is injected into the sample layer A131, it is absorbed by the absorption layer A134, so that the sample A15 flows in a direction toward the absorption layer A134 (as indicated by the arrow in FIG. 2B), and passes through the antibody layer A132 and the nitrocellulose membrane A133 to generate an interactive reaction. The result is reflected through the color changes of a test line A133a and a control line A133b of the nitrocellulose membrane A133, so as to determine whether the virus microorganism is contained in the air in the indoor space. As shown in FIG. 2C, when both colors of the test line A133a and the control line A133b are changed, it is expressed as positive, which means that the virus microorganism is contained in the air in the indoor space. When the color of the test line A133a is not changed and the color of the control line A133b is changed, it is expressed as negative, which means that there is no virus microorganism contained in the air the indoor space.

In another embodiment, as shown in FIG. 4A to FIG. 11, the physical first device A is a microbial detection device 3. The microbial detection device 3 of the physical first device A of the present disclosure includes a controlling circuit board 31, a gas detection main part 32, a microprocessor 33 and a communicator 34. In the embodiment, the gas detection main part 32, the microprocessor 33 and the communicator 34 are integrally packaged on the controlling circuit board 31 and electrically connected to the controlling circuit board 31. The microprocessor 33 and the communicator 34 are disposed on the controlling circuit board 31, and the microprocessor 33 controls the detection of the gas detection main part 32. In that, the gas detection main part 32 detects the at least one microorganism and outputs a detection signal, and the microprocessor receives and processes the detection signal to generate microorganism data and provides the microorganism data to the communicator 34 for a wireless communication transmission externally. Preferably but not exclusively, the wireless communication transmission is one selected from the group consisting of a Wi-Fi communication transmission, a Bluetooth communication transmission, a radio frequency identification communication transmission and a near field communication (NFC) transmission.

Please refer to FIG. 4D to FIG. 9A. In the embodiment, the gas detection main part 32 includes a base 321, a piezoelectric actuator 322, a driving circuit board 323, a laser component 324, a particulate sensor 325 and an outer cover 326. In the embodiment, the base 321 includes a first surface 3211, a second surface 3212, a laser loading region 3213, a gas-inlet groove 3214, a gas-guiding-component loading region 3215 and a gas-outlet groove 3216. The first surface 3211 and the second surface 3212 are two surfaces opposite to each other. In the embodiment, the laser loading region 3213 for the laser component 324 is hollowed out from the first surface 3211 toward the second surface 3212. The outer cover 326 covers the base 321 and includes a side plate 3261. The side plate 3261 has an inlet opening 3261a and an outlet opening 3261b. The gas-inlet groove 3214 is concavely formed from the second surface 3212 and disposed adjacent to the laser loading region 3213. The gas-inlet groove 3214 includes a gas-inlet 3214a and two lateral walls. The gas-inlet 3214a is in communication with an environment outside the base 321, and is spatially corresponding in position to an inlet opening 3261a of the outer cover 326. Two transparent windows 3214b are opened on the two lateral walls of the gas-inlet groove 3214 and are in communication with the laser loading region 3213. Therefore, the first surface 3211 of the base 321 is covered and attached by the outer cover 326, and the second surface 3212 is covered and attached by the driving circuit board 323, so that an inlet path is defined by the gas-inlet groove 3214.

In the embodiment, the gas-guiding-component loading region 3215 mentioned above is concavely formed from the second surface 3212 and in communication with the gas-inlet groove 3214. A ventilation hole 3215a penetrates a bottom surface of the gas-guiding-component loading region 3215. The gas-guiding-component loading region 3215 includes four positioning protrusions 3215b disposed at four corners of the gas-guiding-component loading region 3215, respectively. In the embodiment, the gas-outlet groove 3216 includes a gas-outlet 3216a, and the gas-outlet 3216a is spatially corresponding to the outlet opening 3261b of the outer cover 326. The gas-outlet groove 3216 includes a first section 3216b and a second section 3216c. The first section 3216b is concavely formed out from the first surface 3211 in a region spatially corresponding to a vertical projection area of the gas-guiding-component loading region 3215. The second section 3216c is hollowed out from the first surface 3211 to the second surface 3212 in a region where the first surface 3211 is extended from the vertical projection area of the gas-guiding-component loading region 3215. The first section 3216b and the second section 3216c are connected to form a stepped structure. Moreover, the first section 3216b of the gas-outlet groove 3216 is in communication with the ventilation hole 3215a of the gas-guiding-component loading region 3215, and the second section 3216c of the gas-outlet groove 3216 is in communication with the gas-outlet 3216a. In that, when first surface 3211 of the base 321 is attached and covered by the outer cover 326 and the second surface 3212 of the base 321 is attached and covered by the driving circuit board 323, the gas-outlet groove 3216 and the driving circuit board 323 collaboratively define an outlet path.

In the embodiment, the laser component 324 and the particulate sensor 325 are disposed on and electrically connected to the driving circuit board 323 and located within the base 321. In order to clearly describe and illustrate the positions of the laser component 324 and the particulate sensor 325 in the base 321, the driving circuit board 323 is intentionally omitted. The laser component 324 is accommodated in the laser loading region 3213 of the base 321, and the particulate sensor 325 is accommodated in the gas-inlet groove 3214 of the base 321 and is aligned to the laser component 324. In addition, the laser component 324 is spatially corresponding to the transparent window 3214b. Therefore, a light beam emitted by the laser component 324 passes through the transparent window 3214b and is irradiated into the gas-inlet groove 3214. A light beam path from the laser component 324 passes through the transparent window 3214b and extends in an orthogonal direction perpendicular to the gas-inlet groove 3214. Preferably but not exclusively, the particulate sensor 325 is used for detecting the suspended particulate information. In the embodiment, a projecting light beam emitted from the laser component 324 passes through the transparent window 3214b and enters the gas-inlet groove 3214 to irradiate the suspended particles contained in the gas passing through the gas-inlet groove 3214. When the suspended particles contained in the gas are irradiated and generate scattered light spots, the scattered light spots are received and calculated by the particulate sensor 325 to obtain the gas detection information. In the embodiment, a gas sensor 327 is positioned and disposed on the driving circuit board 323, electrically connected to the driving circuit board 323, and accommodated in the gas-outlet groove 3216, so as to detect the microorganism introduced into the gas-outlet groove 3216. Preferably but not exclusively, in an embodiment, the gas sensor 327 includes a volatile-organic-compound sensor for detecting the gas information of carbon dioxide ($CO_2$) or volatile organic compounds (TVOC). Preferably but not exclusively, in an embodiment, the gas sensor 327 includes a formaldehyde sensor for detecting the gas information of formaldehyde (HCHO). Preferably but not exclusively, in an embodiment, the gas sensor 327 includes a bacteria sensor for detecting the gas information of bacteria or fungi. Preferably but not exclusively, in an embodiment, the gas sensor 327 includes a virus sensor for detecting the gas information of virus.

In the embodiment, the piezoelectric actuator 322 is accommodated in the square-shaped gas-guiding-component loading region 3215 of the base 321. In addition, the gas-guiding-component loading region 3215 of the base 321 is in fluid communication with the gas-inlet groove 3214. When the piezoelectric actuator 322 is enabled, the gas in the gas-inlet 3214 is inhaled into the piezoelectric actuator 322, flows through the ventilation hole 3215a of the gas-guiding-component loading region 3215 into the gas-outlet groove 3216. Moreover, the driving circuit board 323 covers the second surface 3212 of the base 321, and the laser component 324 is positioned and disposed on the driving circuit board 323, and is electrically connected to the driving circuit board 323. The particulate sensor 325 is also positioned and disposed on the driving circuit board 323, and is electrically connected to the driving circuit board 323. In that, when the outer cover 326 covers the base 321, the inlet opening 3261a is spatially corresponding to the gas-inlet 3214a of the base 321, and the outlet opening 3261b is spatially corresponding to the gas-outlet 3216a of the base 321.

In the embodiment, the piezoelectric actuator 322 includes a gas-injection plate 3221, a chamber frame 3222, an actuator element 3223, an insulation frame 3224 and a conductive frame 3225. In the embodiment, the gas-injection plate 3221 is made by a flexible material and includes a suspension plate 3221a and a hollow aperture 3221b. The suspension plate 3221a is a sheet structure and is permitted to undergo a bending deformation. Preferably but not exclusively, the shape and the size of the suspension plate 3221a are accommodated in the inner edge of the gas-guiding-component loading region 3215, but not limited thereto. The hollow aperture 3221b passes through a center of the suspension plate 3221a, so as to allow the gas to flow therethrough. Preferably but not exclusively, in the embodiment, the shape of the suspension plate 3221a is selected from the group consisting of a square, a circle, an ellipse, a triangle and a polygon, but not limited thereto.

In the embodiment, the chamber frame 3222 is carried and stacked on the gas-injection plate 3221. In addition, the shape of the chamber frame 3222 is corresponding to the gas-injection plate 3221. The actuator element 3223 is carried and stacked on the chamber frame 3222. A resonance chamber 3226 is collaboratively defined by the actuator element 3223, the chamber frame 3222 and the suspension plate 3221a and is formed between the actuator element 3223, the chamber frame 3222 and the suspension plate 3221a. The insulation frame 3224 is carried and stacked on the actuator element 3223 and the appearance of the insulation frame 3224 is similar to that of the chamber frame 3222. The conductive frame 3225 is carried and stacked on the insulation frame 3224, and the appearance of the conductive frame 3225 is similar to that of the insulation frame 3224. In addition, the conductive frame 3225 includes a conducting pin 3225a and a conducting electrode 3225b. The conducting pin 3225a is extended outwardly from an outer edge of the conductive frame 3225, and the conducting electrode 3225b is extended inwardly from an inner edge of the conductive frame 3225. Moreover, the actuator element 3223 further includes a piezoelectric carrying plate 3223a, an adjusting resonance plate 3223b and a piezoelectric plate 3223c. The piezoelectric carrying plate 3223a is carried and stacked on the chamber frame 3222. The adjusting resonance plate 3223b is carried and stacked on the piezoelectric carrying plate 3223a. The piezoelectric plate 3223c is carried and stacked on the adjusting resonance plate 3223b. The adjusting resonance plate 3223b and the piezoelectric plate 3223c are accommodated in the insulation frame 3224. The conducting electrode 3225b of the conductive frame 3225 is electrically connected to the piezoelectric plate 3223c. In the embodiment, the piezoelectric carrying plate 3223a and the adjusting resonance plate 3223b are made by a conductive material. The piezoelectric carrying plate 3223a includes a piezoelectric pin 3223d. The piezoelectric pin 3223d and the conducting pin 3225a are electrically connected to a driving circuit (not shown) of the driving circuit board 323, so as to receive a driving signal, such as a driving frequency and a driving voltage. Through this structure, a circuit is formed by the piezoelectric pin 3223d, the piezoelectric carrying plate 3223a, the adjusting resonance plate 3223b, the piezoelectric plate 3223c, the conducting electrode 3225b, the conductive frame 3225 and the conducting pin 3225a for transmitting the driving signal. Moreover, the insulation frame 3224 is insulated between the conductive frame 3225 and the actuator element 3223, so as to avoid the occurrence of a short circuit. Thereby, the driving signal is transmitted to the piezoelectric plate 3223c. After receiving the driving signal such as the driving frequency and the driving voltage, the piezoelectric plate 3223c deforms due to the piezoelectric effect, and the piezoelectric carrying plate 3223a and the adjusting resonance plate 3223b are further driven to generate the bending deformation in the reciprocating manner.

Furthermore, in the embodiment, the adjusting resonance plate 3223b is located between the piezoelectric plate 3223c and the piezoelectric carrying plate 3223a and served as a cushion between the piezoelectric plate 3223c and the piezoelectric carrying plate 3223a. Thereby, the vibration frequency of the piezoelectric carrying plate 3223a is adjustable. Basically, the thickness of the adjusting resonance plate 3223b is greater than the thickness of the piezoelectric carrying plate 3223a, and the vibration frequency of the actuator element 3223 can be adjusted by adjusting the thickness of the adjusting resonance plate 3223b.

Please refer to FIG. 7A, FIG. 7B, FIG. 8A, FIG. 8B and FIG. 9A. In the embodiment, the gas-injection plate 3221, the chamber frame 3222, the actuator element 3223, the insulation frame 3224 and the conductive frame 3225 are stacked and positioned in the gas-guiding-component loading region 3215 sequentially, so that the piezoelectric actuator 322 is supported and positioned in the gas-guiding-component loading region 3215. A plurality of clearances 3221c are defined between the suspension plate 3221a of the gas-injection plate 3221 and an inner edge of the gas-guiding-component loading region 3215 for gas flowing therethrough. In the embodiment, a flowing chamber 3227 is formed between the gas-injection plate 3221 and the bottom surface of the gas-guiding-component loading region 3215. The flowing chamber 3227 is in communication with the resonance chamber 3226 between the actuator element 3223, the chamber frame 3222 and the suspension plate 3221a through the hollow aperture 3221b of the gas-injection plate 3221. By controlling the vibration frequency of the gas in the resonance chamber 3226 to be close to the vibration frequency of the suspension plate 3221a, the Helmholtz resonance effect is generated between the resonance chamber 3226 and the suspension plate 3221a, so as to improve the efficiency of gas transportation. When the piezoelectric plate 3223c is moved away from the bottom surface of the gas-guiding-component loading region 3215, the suspension plate 3221a of the gas-injection plate 3221 is driven to move away from the bottom surface of the gas-guiding-component loading region 3215 by the piezoelectric plate 3223c. In that, the volume of the flowing chamber 3227 is expanded rapidly, the internal pressure of the flowing chamber 3227 is decreased to form a negative pressure, and the gas outside the piezoelectric actuator 322 is inhaled through the clearances 3221c and enters the resonance chamber 3226 through the hollow aperture 3221b. Consequently, the pressure in the resonance chamber 3226 is increased to generate a pressure gradient. When the suspension plate 3221a of the gas-injection plate 3221 is driven by the piezoelectric plate 3223c to move toward the bottom surface of the gas-guiding-component loading region 3215, the gas in the resonance chamber 3226 is discharged out rapidly through the hollow aperture 3221b, and the gas in the flowing chamber 3227 is compressed, thereby the converged gas is quickly and massively ejected out of the flowing chamber 3227 under the condition close to an ideal gas state of the Benulli's law, and transported to the ventilation hole 3215a of the gas-guiding-component loading region 3215.

Figure 9A:
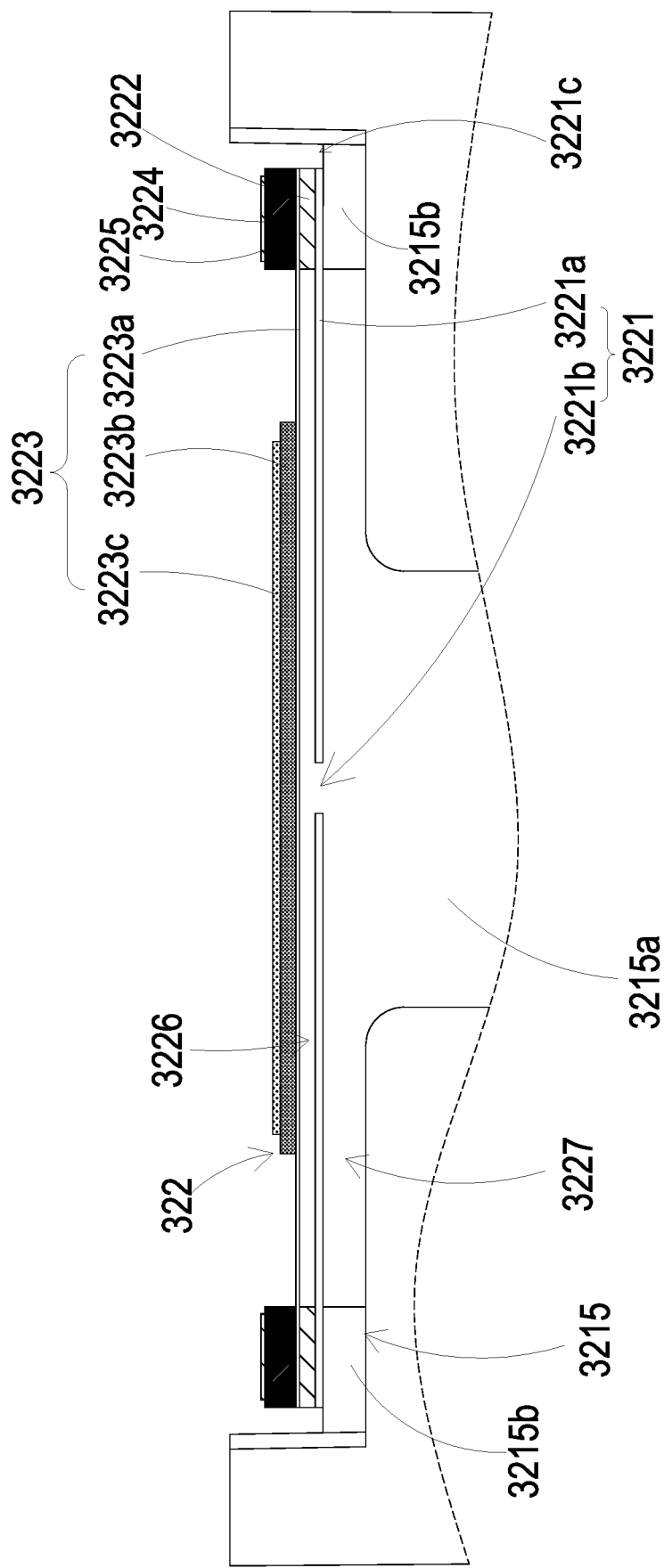
FIG. 9A is a schematic cross-sectional view (1) illustrating an action of the piezoelectric actuator according to the embodiment of the present disclosure.
Figure 9B:
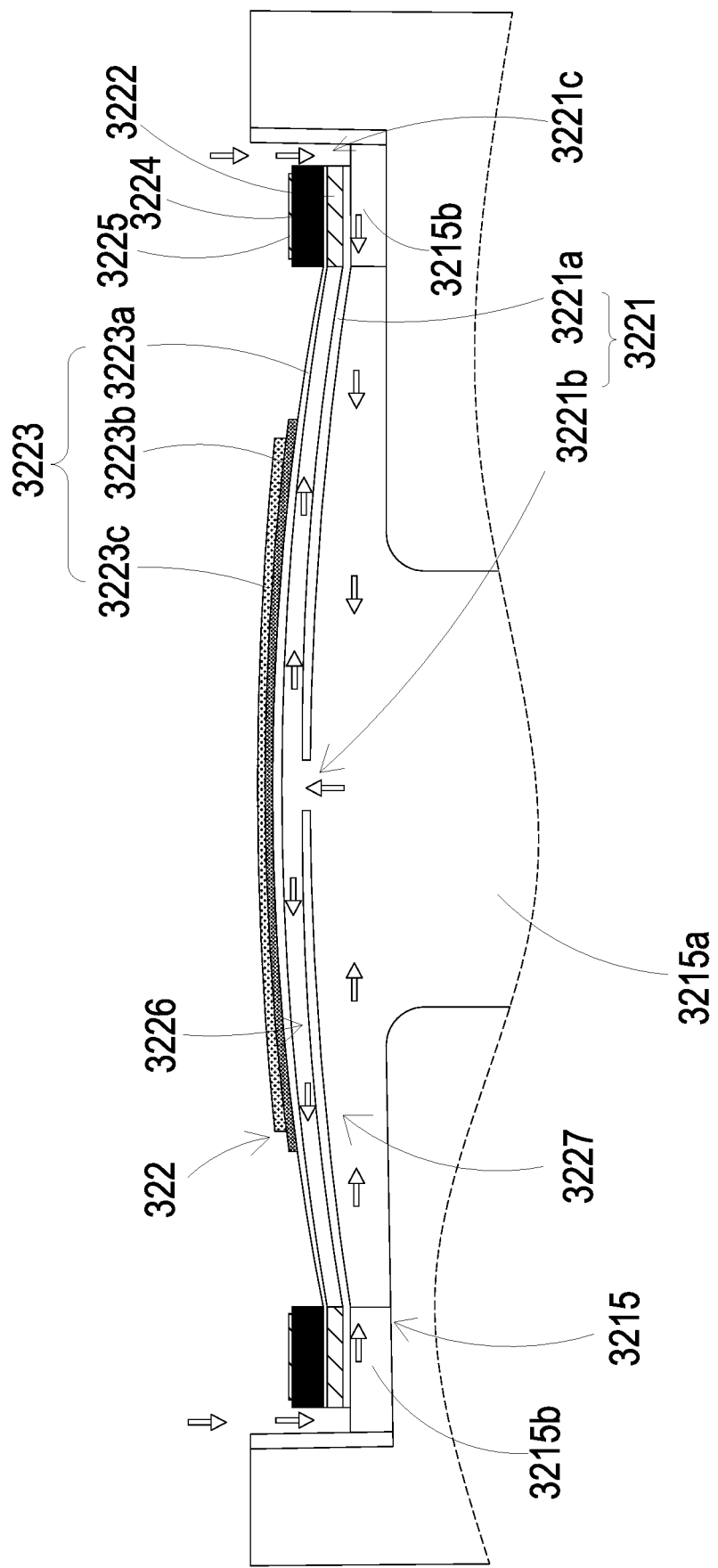
FIG. 9B is a schematic cross-sectional view (2) illustrating of the piezoelectric actuator according to the embodiment of the present disclosure.
Figure 9C:
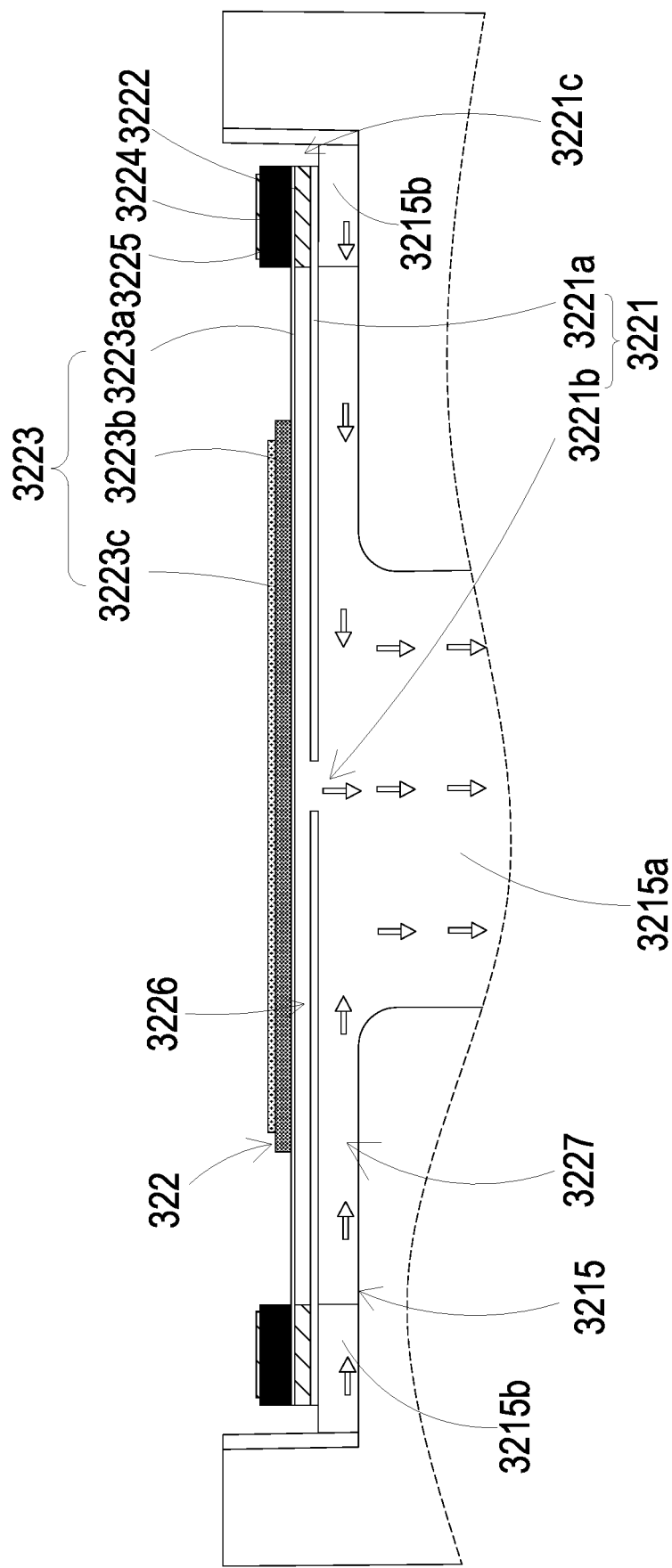
FIG. 9C is a schematic cross-sectional view (3) illustrating an action of the piezoelectric actuator of the central controller according to the embodiment of the present disclosure.
Figure 10A:
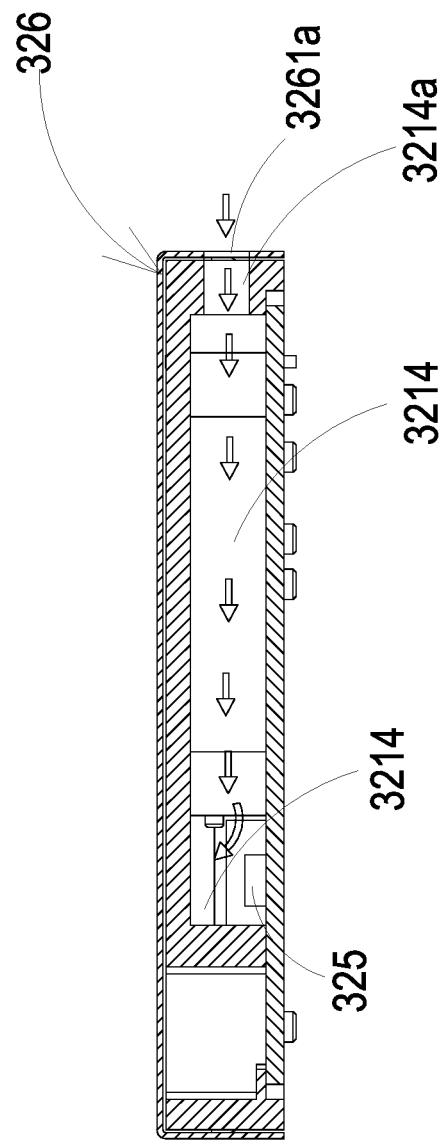
FIG. 10A is a schematic cross-sectional view (1) illustrating the gas detection main part according to the embodiment of the present disclosure.
Figure 10B:
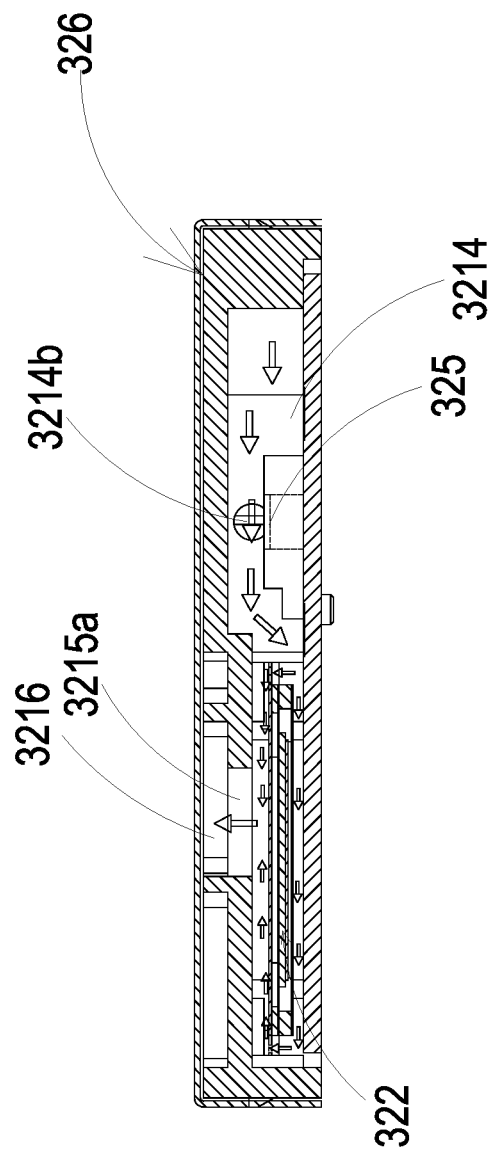
FIG. 10B is a schematic cross-sectional view (2) illustrating the gas detection main part according to the embodiment of the present disclosure.
Figure 10C:
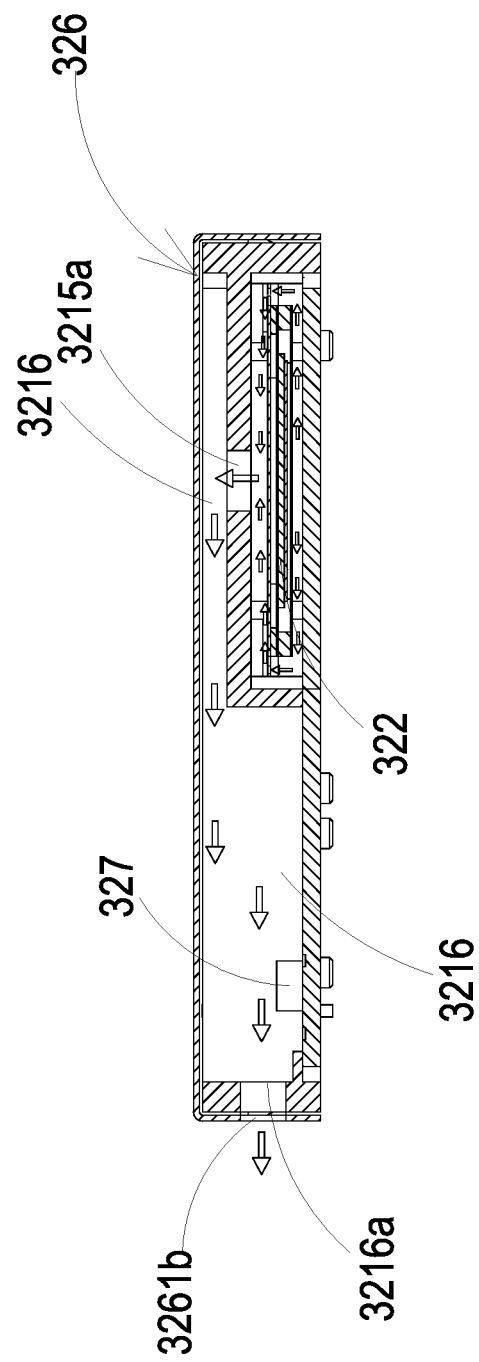
FIG. 10C is a schematic cross-sectional view (3) illustrating the gas detection main part according to the embodiment of the present disclosure.
Figure 11:
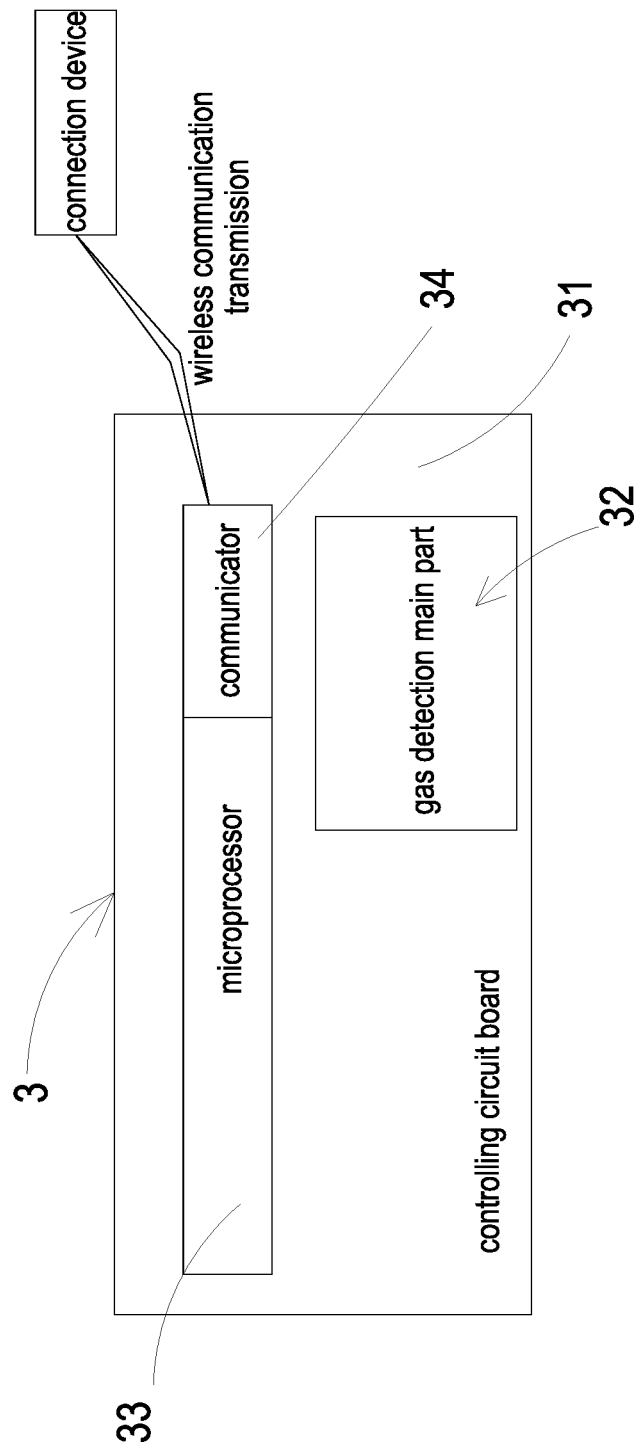
FIG. 11 is a block diagram showing the signal transmission of the microbial detection device according to the embodiment of the present disclosure.

By repeating the above operation steps shown in FIG. 9B and FIG. 9C, the piezoelectric plate 3223c is driven to generate the bending deformation in a reciprocating manner. According to the principle of inertia, since the gas pressure inside the resonance chamber 3226 is lower than the equilibrium gas pressure after the converged gas is ejected out, the gas is introduced into the resonance chamber 3226 again. Moreover, the vibration frequency of the gas in the resonance chamber 3226 is controlled to be close to the vibration frequency of the piezoelectric plate 3223c, so as to generate the Helmholtz resonance effect to achieve the gas transportation at high speed and in large quantities. The gas is inhaled through the inlet opening 3261a of the outer cover 326, flows into the gas-inlet groove 3214 of the base 321 through the gas-inlet 3214a, and is transported to the position of the particulate sensor 325. The piezoelectric actuator 322 is enabled continuously to inhale the gas into the inlet path, and facilitate the gas outside the gas detection device to be introduced rapidly, flow stably, and transported above the particulate sensor 325. At this time, a projecting light beam emitted from the laser component 324 passes through the transparent window 3214b to irritate the suspended particles contained in the gas flowing above the particulate sensor 325 in the gas-inlet groove 3214. When the suspended particles contained in the gas are irradiated and generate scattered light spots, the scattered light spots are received and calculated by the particulate sensor 325 for obtaining related information about the sizes and the concentration of the suspended particles contained in the gas. Moreover, the gas above the particulate sensor 325 is continuously driven and transported by the piezoelectric actuator 322, flows into the ventilation hole 3215a of the gas-guiding-component loading region 3215, and is transported to the gas-outlet groove 3216. At last, after the gas flows into the gas outlet groove 3216, the gas is continuously transported into the gas-outlet groove 3216 by the piezoelectric actuator 322, and thus the gas in the gas-outlet groove 3216 is pushed to discharge through the gas-outlet 3216a and the outlet opening 3261b.

In the present disclosure, the microbial detection device A can not only detect the suspended particles in the gas, but also further detect the characteristics of the imported gas, such as formaldehyde, ammonia, carbon monoxide, carbon dioxide, oxygen and ozone. Notably, what the air pollution (including but not limited to the microorganism) is "completely cleaned" or "completely clean" through the first device A and the second device B in the method for detecting, locating and completely cleaning indoor microorganism means that the air pollution is filtered and completely cleaned to reach a safety detection value. Preferably but not exclusively, in some embodiments, the safety detection value is zero to form a clean and safe breathing air state. Preferably but not exclusively, the safety detection value may also include at least one selected from the group consisting of a concentration of $PM_{2.5}$ which is less than 10 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 $CFU/m^3$, a colony-forming unit of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, a concentration of lead which is less than 0.15 $\mu g/m^3$, and a colony-forming unit of virus which is less than 500 $CFU/m^3$. Therefore, the microbial detection device A of the present disclosure further includes a gas sensor 327. Preferably but not exclusively, the gas sensor 327 is positioned and electrically connected to the driving circuit board 323, and is accommodated in the gas outlet groove 3216, so as to detect the concentration or the characteristics of volatile organic compounds contained in the gas drained out through the outlet path, and detect the concentration, the species or the size of bacteria, fungi, virus contained in the gas drained out through the outlet path.

Figure 4A:
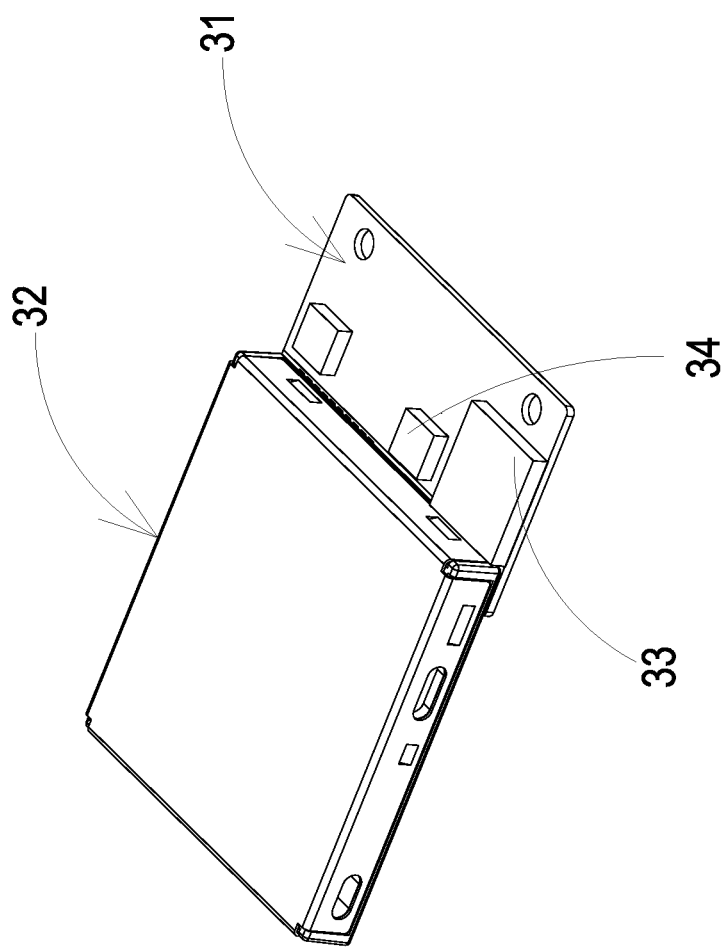
FIG. 4A is a schematic perspective view illustrating the microbial detection device according to the embodiment of the present disclosure.
Figure 4B:
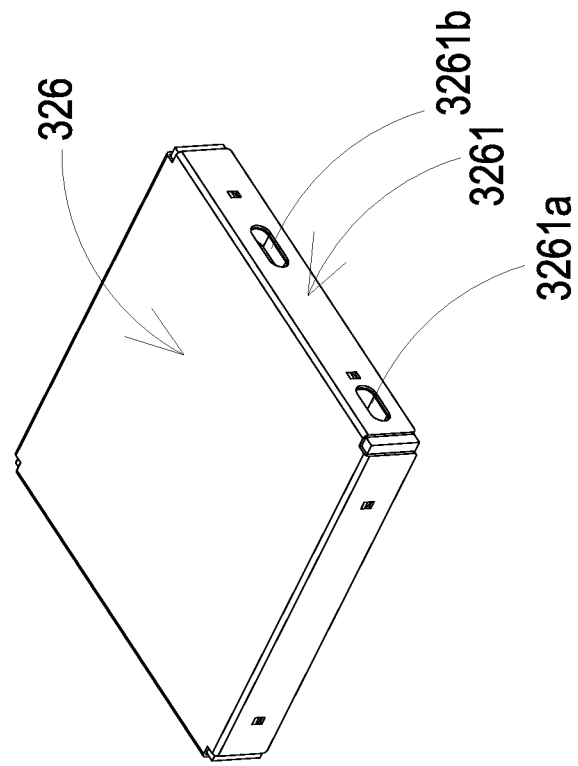
FIG. 4B is a schematic perspective view (1) illustrating the gas detection main part according to the embodiment of the present disclosure.
Figure 4C:
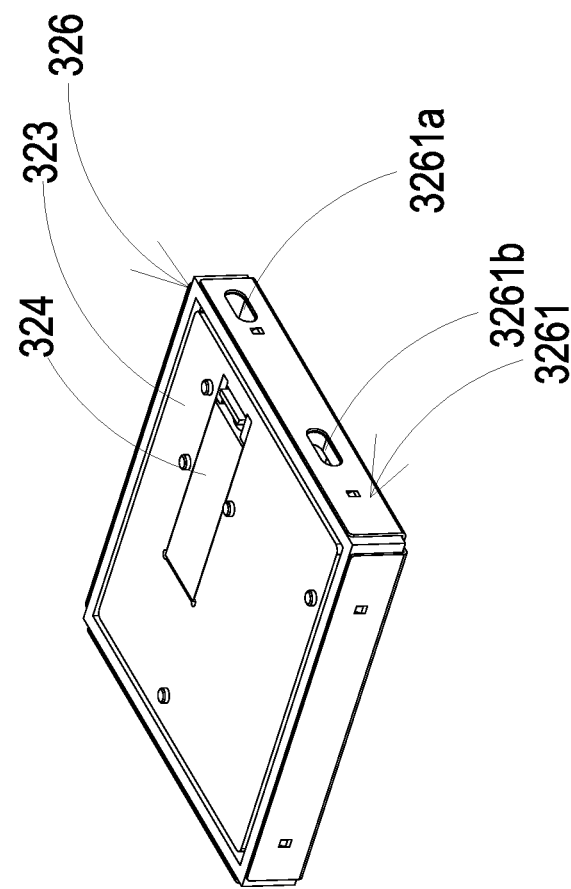
FIG. 4C is a schematic perspective view (2) illustrating the gas detection main part of the central controller for completely cleaning indoor microorganism according to the embodiment of the present disclosure.
Figure 4D:
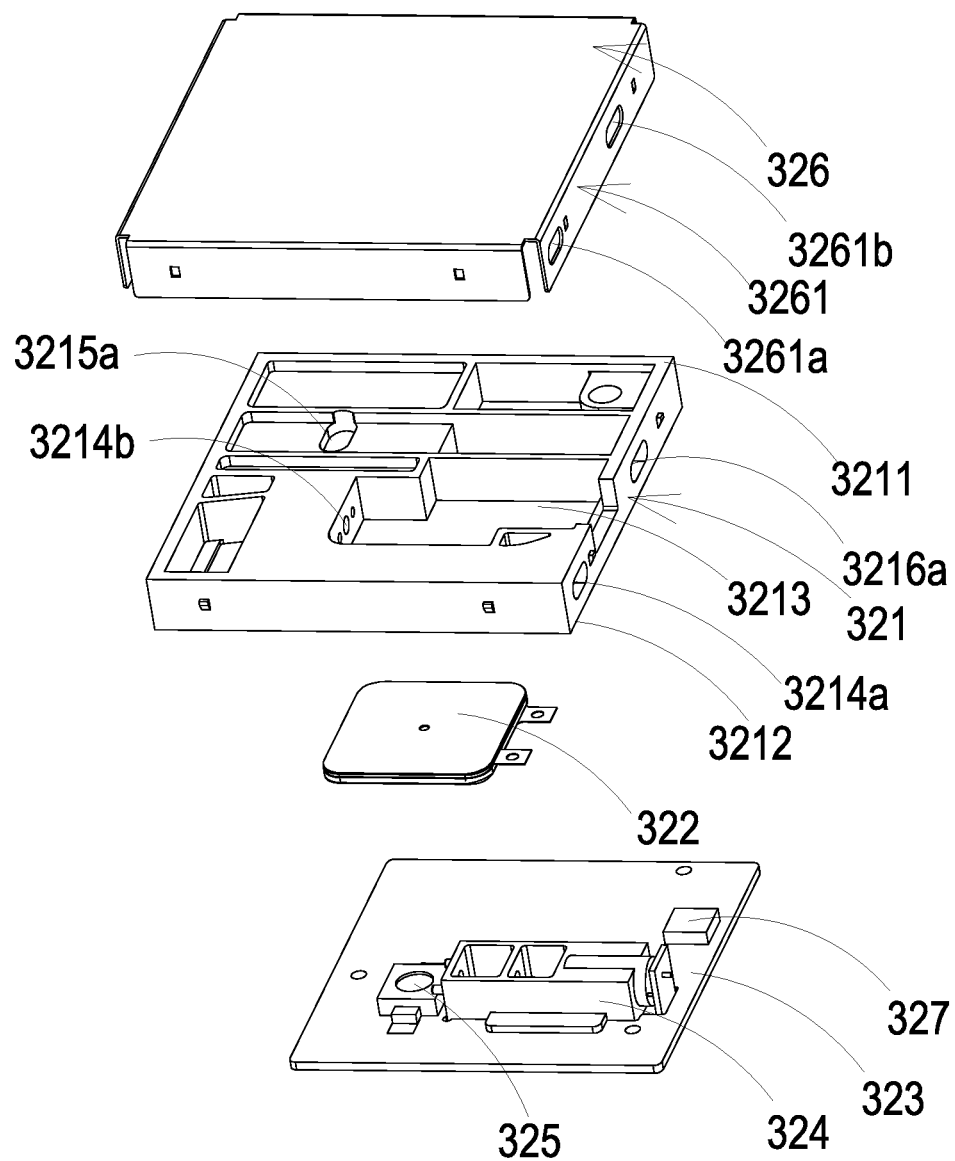
FIG. 4D is an exploded view illustrating the microbial detection device according to the embodiment of the present disclosure.
Figure 5A:
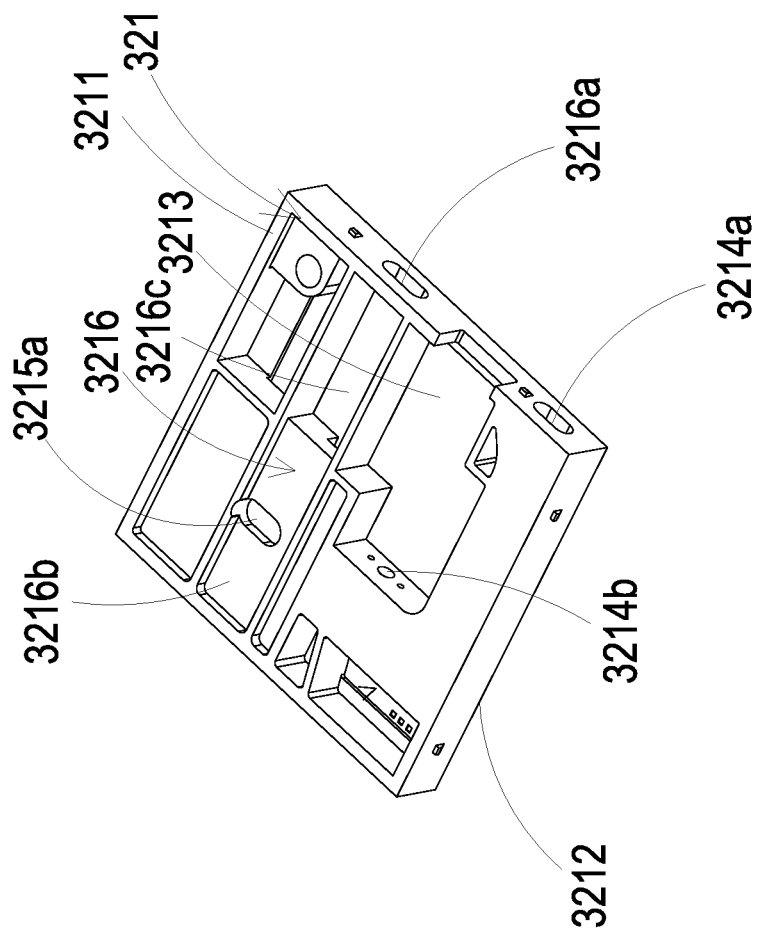
FIG. 5A is a schematic perspective view (1) illustrating the base according to the embodiment of the present disclosure.
Figure 5B:
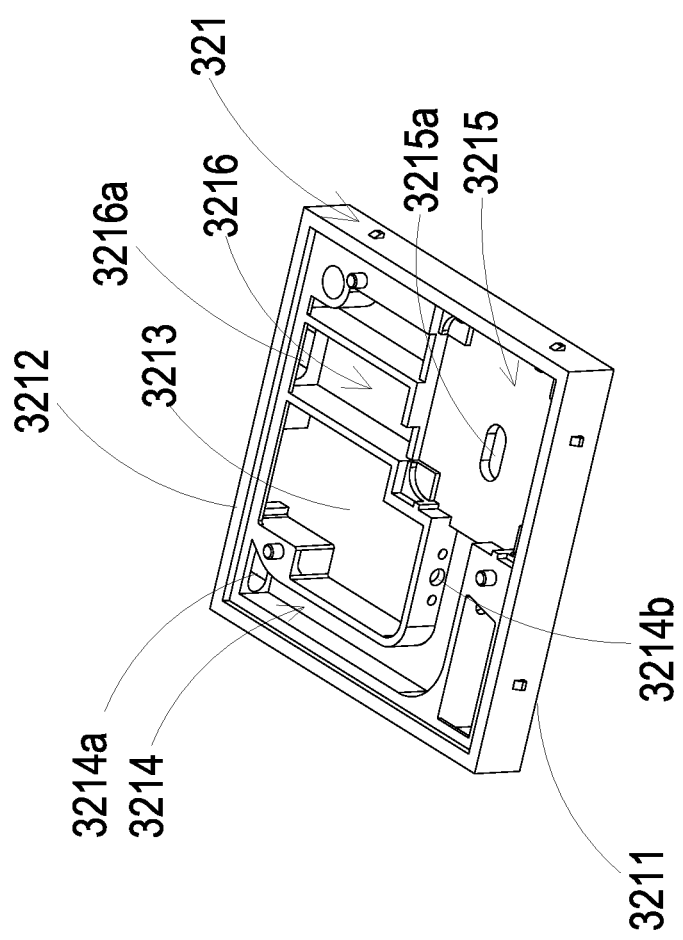
FIG. 5B is a schematic perspective view (2) illustrating the base according to the embodiment of the present disclosure.
Figure 6:
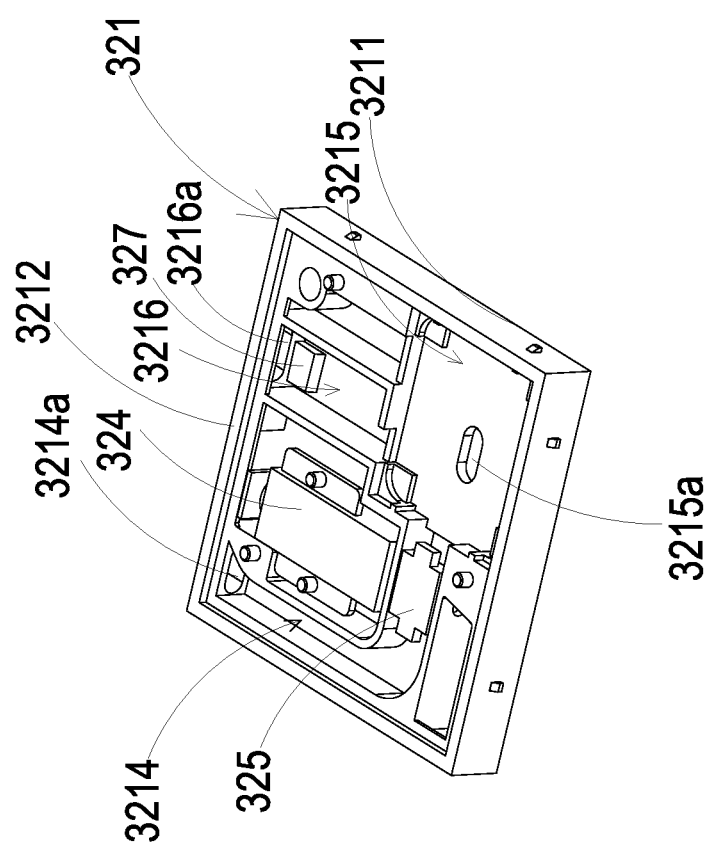
FIG. 6 is a schematic view (3) illustrating the base according to the embodiment of the present disclosure.
Figure 7A:
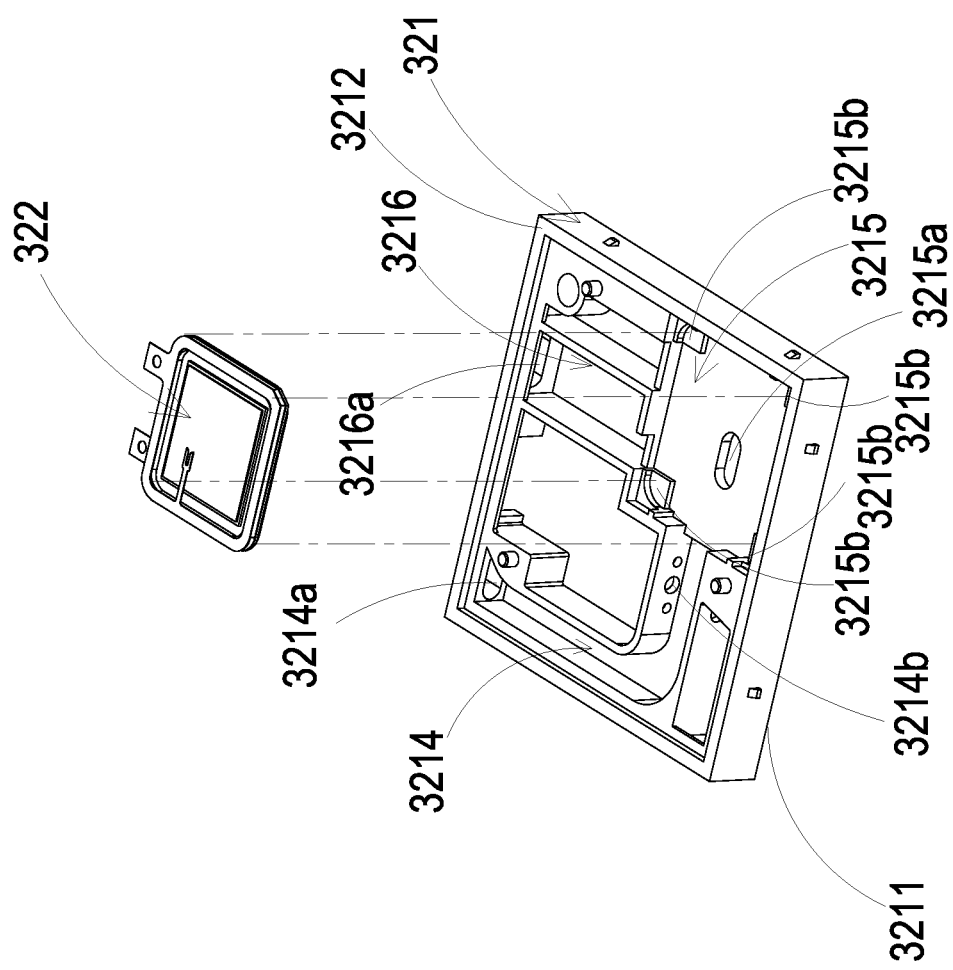
FIG. 7A is a schematic exploded view illustrating the combination of the piezoelectric actuator and the base according to the embodiment of the present disclosure.
Figure 7B:
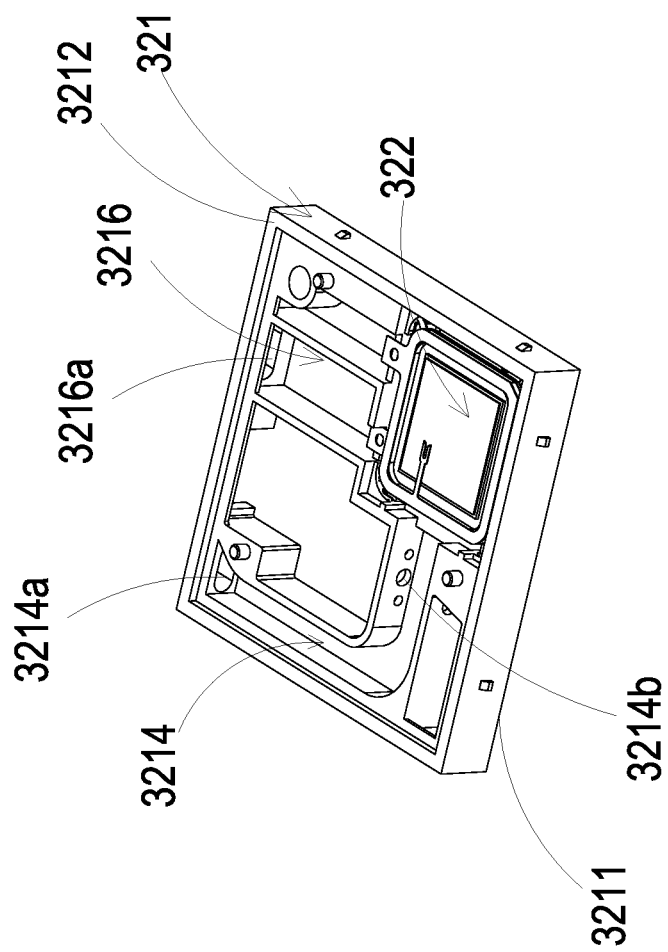
FIG. 7B is a schematic perspective view illustrating the combination of the piezoelectric actuator and the base according to the embodiment of the present disclosure.
Figure 8A:
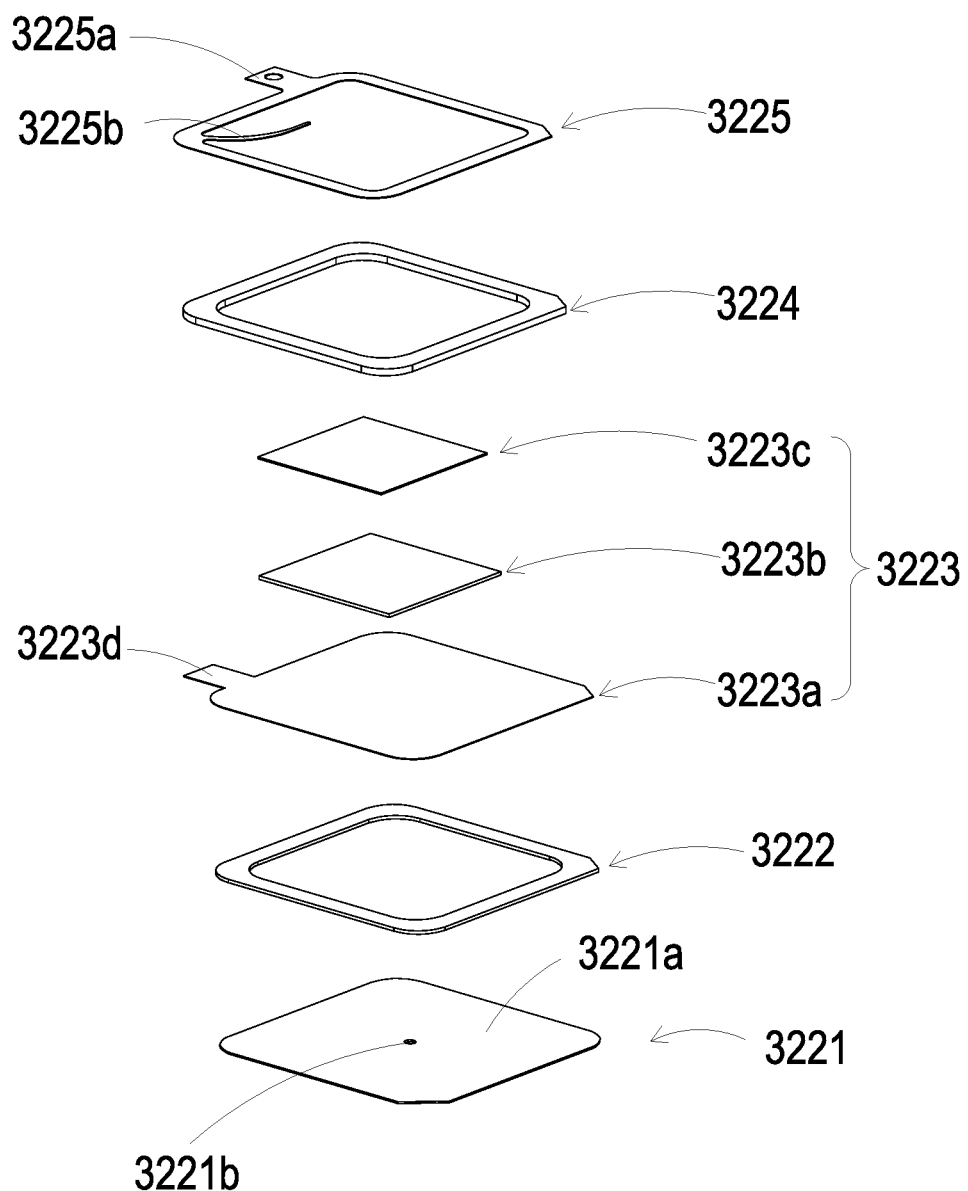
FIG. 8A is a schematic exploded view (1) illustrating the piezoelectric actuator according to the embodiment of the present disclosure.
Figure 8B:
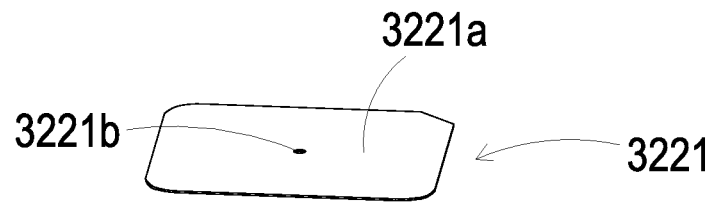
FIG. 8B is a schematic exploded view (2) illustrating the piezoelectric actuator according to the embodiment of the present disclosure.
Figure 8B:
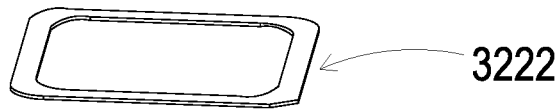
Figure 8B:
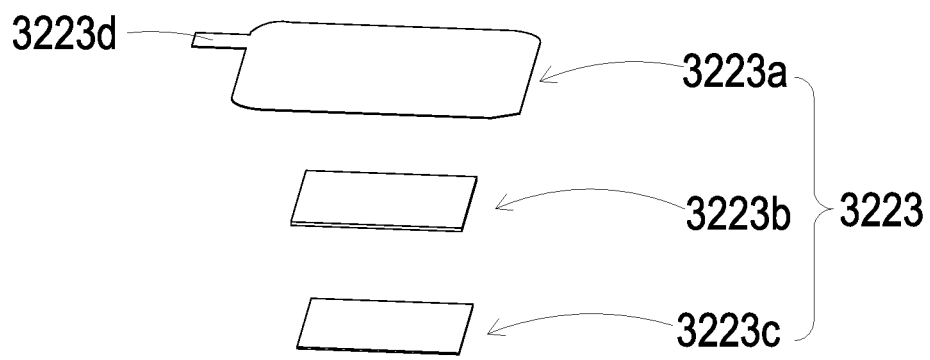
Figure 8B:
Figure 8B:
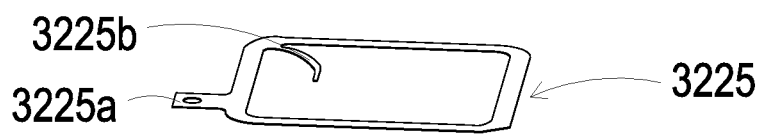

In addition, the microbial detection device of the physical first device A shown in FIG. 1 and FIG. 4A is taken as a specific embodiment for description, but the present disclosure is not limited thereto. A plurality of microbial detection devices receive and compare the microorganism data detected in the indoor space through the connection of a cloud device E. Then, the microorganism data that is intelligently calculated to be the highest one is used to determine the location of the microorganism in the indoor space. Accordingly, in the method for detecting, locating and completely cleaning indoor microorganism, at least one gas pump C is widely disposed in an indoor space to provide an airflow to inhale air thereinto at any time, and collect at least one microorganism contained in the air at any time. The airflow is utilized to transport the at least one microorganism to at least one physical first device A and/or chemical first device A and/or microbial first device A for detecting and locating a concentration, a species or a size of the at least one microorganism. Artificial intelligence operations are implemented through a wireless network to determine the location of the at least one microorganism. Then, at least one fan 1 closest to the location of the at least one microorganism is selectively enabled according to the artificial intelligence operations to generate a directional air convection, so that the at least one microorganism is transported to at least one physical second device B and/or chemical second device B and/or microbial second device B for elimination and complete clearance.

Notably, a wireless connection of the cloud device E is utilized to perform the artificial intelligence operations through the wireless network, and microorganism data detected by the microbial detection device in the indoor space are received and compared through the connection of the cloud device E. As a result, the artificial intelligence operations are implemented to determine the location of the at least one microorganism in the indoor space, and a controlling instruction is intelligently and selectively issued to enable the fan 1 closest to the location of the at least one microorganism. Whereby, the directional air convection is generated, and the at least one microorganism is transported to at least one of physical second device B and/or chemical second device B and/or microbial second device B for elimination and complete clearance.

A link between the microorganism data detected by the microbial detection device in the indoor space and the cloud device E is implemented through a smart phone in an embodiment. The microorganism data detected by the microbial detection device are received by the smart phone, and transmitted to the cloud device E through an application program (APP) of the smart phone, so that the microorganism data detected by the at least one microbial detection device in the indoor space are received and compared by the cloud device E, the artificial intelligence operations are implemented to determine the location of the at least one microorganism in the indoor space, and the controlling instruction is intelligently and selectively issued to enable the fan 1 closest to the location of the at least one microorganism. Whereby, the directional air convection is generated, and the at least one microorganism is transported to at least one of physical second device B and/or chemical second device B and/or microbial second device B for elimination and complete clearance.

Figure 3A:
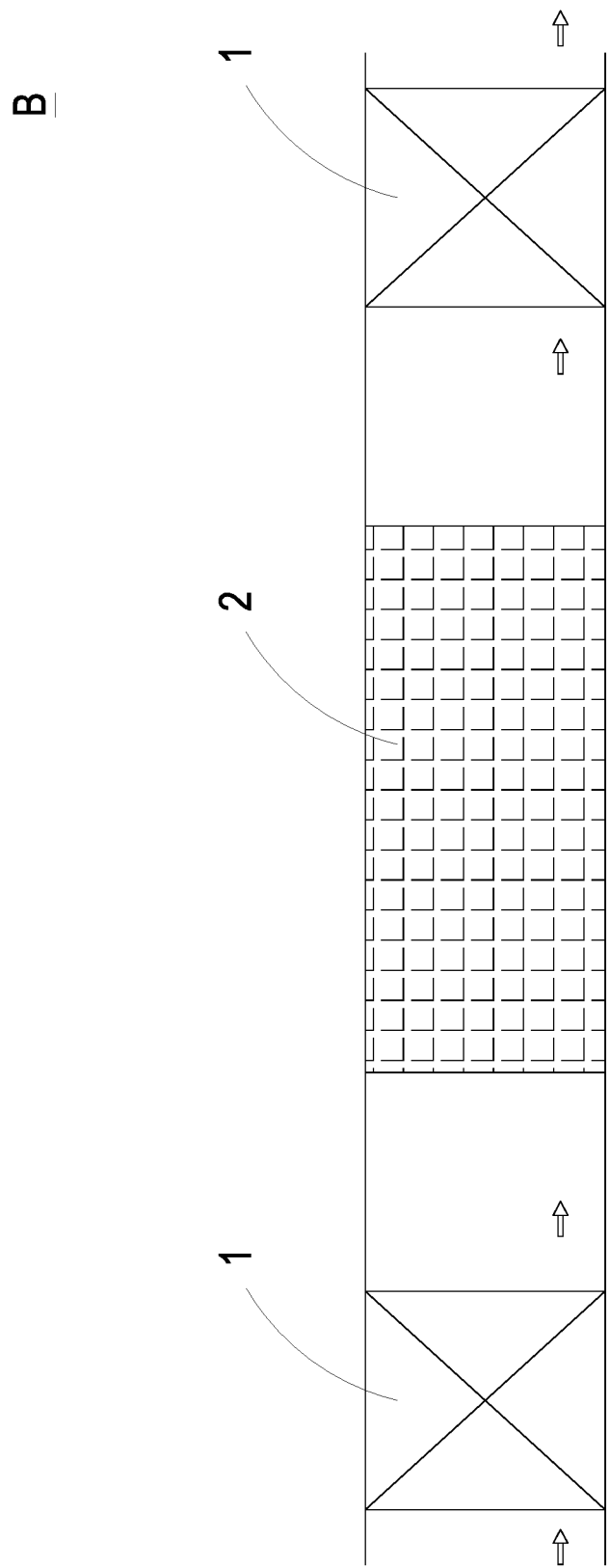
FIG. 3A is a schematic perspective view illustrating the fan and the filter screen of the physical second device and/or chemical second device in the method for detecting, locating and completely cleaning indoor microorganism according to the embodiment of the present disclosure.
Figure 3B:
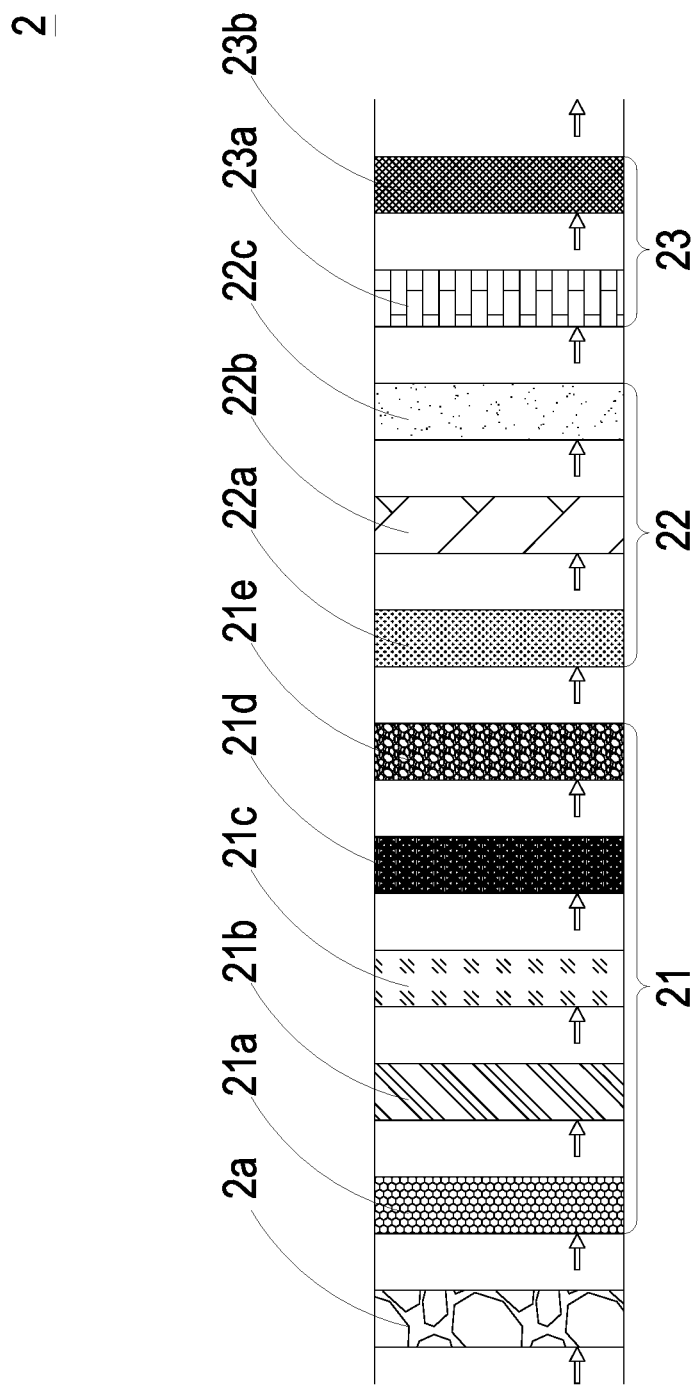
FIG. 3B is a schematic perspective view illustrating the filter screen according to the embodiment of the present disclosure.

Notably, in the embodiment, the at least one physical second device B and/or chemical second device B and/or microbial second device B is a filtration device for eliminating and completely cleaning the at least one microorganism. As shown in FIG. 3A and FIG. 3B, each of the physical second device B and/or chemical second device B and/or microbial second device B includes at least one filter screen 2, and the fan 1 can intake or exhaust gas in both directions. In an airflow path (the direction shown by the arrow), the fan 1 is disposed at the front side of the filter screen 2, or the fan 1 is disposed at the rear side of the filter screen 2. As shown in FIG. 3A, the fans 1 are arranged at the front and rear sides of the filter screen 2. Certainly, in other embodiments, the arrangement of the fans 1 is designed and adjustable according to the practical requirements. As shown in the embodiment of FIG. 1, the physical second device B and/or chemical second device B and/or microbial second device B is a fresh air fan B1, a purifier B2, an exhaust fan B3, a range hood B4 or an electric fan B5. Certainly, the type and/or the number of the fan 1, the physical second device B and/or chemical second device B and/or microbial second device B is not limited to one. For example, the number of the fan 1, the physical second device B and/or chemical second device B and/or microbial second device B is more than one. In an embodiment, the physical second device B is a filtration device blocking, absorbing and removing substance through a filter screen 2. Preferably but not exclusively, the filter screen 2 is a high efficiency particulate air (HEPA) filter screen 2*a*, which is configured to absorb the chemical smoke, the bacteria, the dust particles and the pollen contained in the microorganism, so that the microorganism introduced into the filter screen 2 is filtered and purified to achieve the effect of filtering and purification. In the embodiment, the chemical filtration device B is a filtration device removing substance by coating a decomposition layer 21. Preferably but not exclusively, the decomposition layer 21 is an activated carbon 21*a*, which is configured to remove the organic and inorganic substances in the microorganism and remove the colored and odorous substances.

Preferably but not exclusively, the decomposition layer 21 is a cleansing factor containing chlorine dioxide layer 21*b*, which is configured to inhibit viruses, bacteria, fungi, influenza A, influenza B, enterovirus and norovirus in the microorganism, and the inhibition ratio can reach 99%, thereby reducing the cross-infection of viruses. Preferably but not exclusively, the decomposition layer 21 is an herbal protective layer 21*c*, which is configured to resist allergy effectively and destroy a surface protein of influenza virus (H1N1) passing therethrough. Preferably but not exclusively, the decomposition layer 21 is a silver ion 21*d*, which is configured to inhibit viruses, bacteria and fungi contained in the microorganism. Preferably but not exclusively, the decomposition layer 21 is a zeolite 21*e*, which is configured to remove ammonia nitrogen, heavy metals, organic pollutants, *Escherichia coli*, phenol, chloroform and anionic surfactants. In an embodiment, the microbial second device B is a filtration device removing substance by a filter screen 2 combined with a light irradiation element 22. Preferably but not exclusively, the light irradiation element 22 is a photocatalyst unit including a photo catalyst 22*a* and an ultraviolet lamp 22*b*. When the photo catalyst 22*a* is irradiated by the ultraviolet lamp 22*b*, the light energy is converted into the chemical energy to decompose harmful substances contained in the microorganism and disinfect bacteria contained in the microorganism, so as to achieve the effects of filtering and purifying. Preferably but not exclusively, the light irradiation element 22 is a photo-plasma unit including a nanometer irradiation tube 22*c*. When the microorganism is irradiated by the nanometer irradiation tube 22*c*, oxygen molecules and water molecules contained in the microorganism are decomposed into high oxidizing photo-plasma, and generates an ion flow capable of destroying organic molecules. In that, the harmful substances contained in the microorganism are disinfected and sterilized, so as to achieve the effects of filtering and purifying. In an embodiment, the microbial second device B is a filtration device removing substance by a filter screen 2 combined with a decomposition unit 23. Preferably but not exclusively, the decomposition unit 23 is a negative ion unit 23*a*. It makes the suspended particles contained in the microorganism to carry with positive charge and adhered to a dust collecting plate carry with negative charges, so as to achieve the effects of filtering and purifying the microorganism introduced. Preferably but not exclusively, the decomposition unit 23 is a plasma ion unit 23*b*. Through the plasma ions, the oxygen molecules and the water molecules contained in the microorganism are decomposed into positive hydrogen ions (RP) and negative oxygen ions ($O_2^-$), and the substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced microorganism and achieve the effects of filtering and purifying.

Figure 3C:
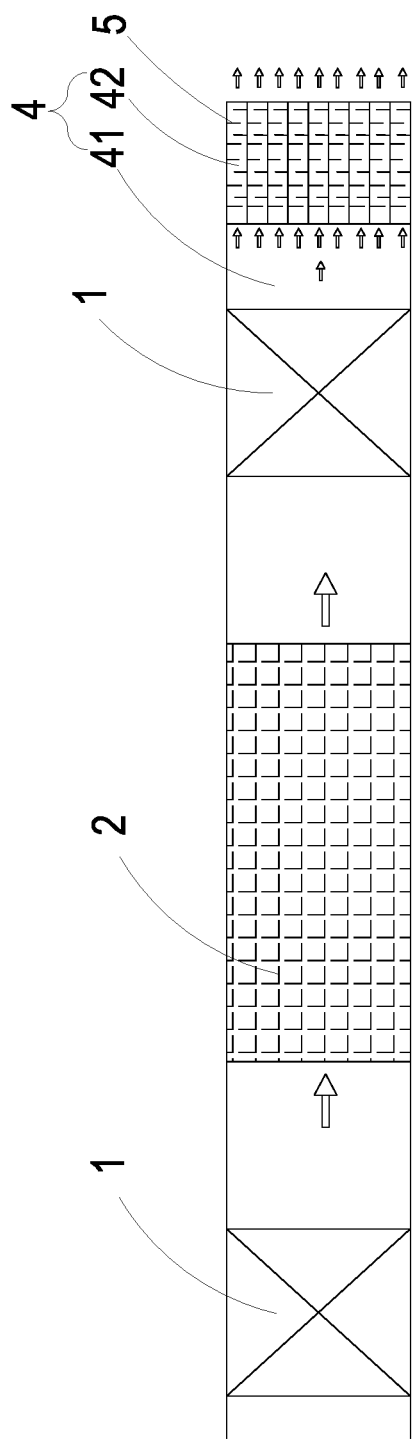
FIG. 3C is a schematic perspective view illustrating the fan, the filter screen and the alcohol sterilization chamber of the physical second device and/or chemical second device for implementing microbial filtration elimination and complete clearance according to the embodiment of the present disclosure.

Moreover, notably, in the embodiment, the at least one physical second device B and/or chemical second device B and/or microbial second device B further allows the at least one microorganism contained in the air to be eliminated and completely cleared by a sterilizing substance 5. Preferably but not exclusively, the sterilizing substance 5 is a microbial sterilizing substance present in a gaseous, liquid or solid state. Preferably but not exclusively, the sterilizing substance 5 is alcohol or sodium hypochlorite. In an embodiment, as shown in FIG. 3C, the at least one physical second device B and/or chemical second device B and/or microbial second device comprises a sterilization chamber 4, which allows the at least one microorganism contained in the air to be eliminated and completely cleared by the sterilizing substance. In the embodiment, the sterilization chamber 4 includes a guiding channel 41 and a plurality of compression chambers 42. The guiding channel 41 is in communication with the plurality of the compression chambers 43, and the sterilizing material 5 is sprayed through each of the plurality of compression chambers 42. In this way, the fan 1 guides the at least one microorganism contained in the air to pass through the at least one second physical device B and/or second chemical device B and/or microbial second device B for filtering and purifying through the filter screen 2 thereof, and then another fan 1 in back of the filter screen 2 guides the air after filtering and purifying to be concentrated into the guiding channel 41 of the sterilization chamber, so that the air after filtering and purifying is compressed and separated through the plurality of compression chambers 42 in communication with the guiding channel 41. Thereby, the sterilizing substrate 5 is sprayed by separating the air after filtering and purifying through the plurality of compression chambers 42 with a small space, so that the at least one microorganism contained in the air is eliminated and completely cleared.

In summary, the present disclosure provides a method for detecting, locating and completely cleaning indoor microorganism. By widely disposing at least one gas pump in an indoor space, an airflow is provided to inhale air by at least one gas pump at any time, and collect at least one microorganism contained in the air at any time. The at least one microorganism is transported by the airflow to at least one physical first device and/or chemical first device and/or microbial first device for detecting and locating a concentration, a species or a size of the at least one microorganism. Moreover, artificial intelligence operations are implemented through a wireless network to determine the location of the at least one microorganism, and at least one fan closest to the location of the at least one microorganism is intelligently selected and enabled to generate a directional air convection, so that the at least one microorganism is transported to at least one of physical second device and/or chemical second device and/or microbial second device for elimination and complete clearance. As a result, the effects of microorganism-locating, microorganism-draining and microorganism-completely-cleaning are achieved. The present disclosure includes the industrial applicability and the inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting, locating and completely cleaning indoor microorganism, comprising:

disposing at least one gas pump in an indoor space to provide an airflow to inhale air thereinto at any time, and collect at least one microorganism contained in the air at any time;

utilizing the airflow to transport the at least one microorganism to at least one physical first device and/or chemical first device and/or microbial first device for detecting and locating a concentration, a species or a size of the at least one microorganism;

implementing artificial intelligence operations through a wireless network to determine the location of the at least one microorganism; and selecting and enabling at least one fan closest to the location of the at least one microorganism to generate a directional air convection, so that the at least one microorganism is transported to at least one physical second device and/or chemical second device and/or microbial second device for elimination and complete clearance, wherein the at least one physical second device and/or chemical second device and/or microbial second device further allows the at least one microorganism contained in the air to be eliminated and completely cleared by a sterilizing substance, wherein the at least one physical second device and/or chemical second device and/or microbial second device comprises a sterilization chamber, which allows the at least one microorganism contained in the air to be eliminated and completely cleared by the sterilizing substance, wherein the sterilization chamber comprises a guiding channel and a plurality of compression chambers, the guiding channel is in communication with the plurality of the compression chambers, and the sterilizing material is sprayed through each of the plurality of compression chambers, wherein the fan guides the at least one microorganism contained in the air to pass through the at least one second physical device and/or second chemical device and/or microbial second device for filtering and purifying, and then another fan in back of the at least one second physical device and/or second chemical device and/or microbial second device guides the air after filtering and purifying to be concentrated into the guiding channel of the sterilization chamber, so that the air after filtering and purifying is compressed and separated through the plurality of compression chambers in communication with the guiding channel, wherein the sterilizing substrate is sprayed by separating the air after filtering and purifying through the plurality of compression chambers with a small space, so that the at least one microorganism contained in the air is eliminated and completely cleared.

2. The method for detecting, locating and completely cleaning indoor microorganism according to claim 1, wherein the microorganism is at least one selected from the group consisting of bacteria, fungi, virus and a combination thereof.

3. The method for detecting, locating and completely cleaning indoor microorganism according to claim 1, wherein the at least one physical first device and/or chemical first device and/or microbial first device is a microbial detection device for detecting and locating the concentration, the species or the size of the at least one microorganism.

4. The method for detecting, locating and completely cleaning indoor microorganism according to claim 3, wherein the physical first device is a microbial detection device implementing detection through a sensor.

5. The method for detecting, locating and completely cleaning indoor microorganism according to claim 3, wherein the chemical first device is a microbial detection device implementing detection through a chemical element material directly.

6. The method for detecting, locating and completely cleaning indoor microorganism according to claim 3, wherein the microbial first device is a microbial detection device that detects a stimulus response of a microbial or a microbial material to a foreign compound.

7. The method for detecting, locating and completely cleaning indoor microorganism according to claim 3, wherein the artificial intelligence operations are performed utilizing a cloud device through the wireless network, and microorganism data detected by the microbial detection device in the indoor space are received and compared by the cloud device through the wireless network, so that the artificial intelligence operations are performed to determine the location of the at least one microorganism in the indoor space, and a controlling instruction is selectively issued by the cloud device to enable the fan closest to the location of the at least one microorganism, wherein the directional air convection is generated, and the at least one microorganism is transported to at least one of physical second device and/or chemical second device and/or microbial second device for elimination and complete clearance.

8. The method for detecting, locating and completely cleaning indoor microorganism according to claim 7, wherein a link between the microorganism data detected by the microbial detection device in the indoor space and the cloud device is implemented through a smart phone, wherein the microorganism data detected by the microbial detection device are received by the smart phone, and transmitted to the cloud device through an application program of the smart phone, so that the microorganism data detected by the at least one microbial detection device in the indoor space are received and compared by the cloud device, the artificial intelligence operations are implemented to determine the location of the at least one microorganism in the indoor space, and the controlling instruction is selectively issued to enable the fan closest to the location of the at least one microorganism, wherein the directional air convection is generated, and the at least one microorganism is transported to at least one of physical second device and/or chemical second device and/or microbial second device for elimination and complete clearance.

9. The method for detecting, locating and completely cleaning indoor microorganism according to claim 1, wherein the at least one physical second device and/or chemical second device and/or microbial second device is a filtration device.

10. The method for detecting, locating and completely cleaning indoor microorganism according to claim 9, wherein the physical second device is a filtration device blocking, absorbing and removing substance through a filter screen.

11. The method for detecting, locating and completely cleaning indoor microorganism according to claim 10, wherein the filter screen is a high efficiency particulate air (HEPA) filter screen.

12. The method for detecting, locating and completely cleaning indoor microorganism according to claim 9, wherein the chemical second device is a filtration device removing substance by coating a decomposition layer.

13. The method for detecting, locating and completely cleaning indoor microorganism according to claim 12, wherein the decomposition layer is at least one selected from the group consisting of an activated carbon, a cleansing factor containing chlorine dioxide layer and a combination thereof.

14. The method for detecting, locating and completely cleaning indoor microorganism according to claim 12, wherein the decomposition layer is an herbal protective layer extracted from ginkgo and Japanese *Rhus chinensis* to form an herbal protective anti-allergic filter.

15. The method for detecting, locating and completely cleaning indoor microorganism according to claim 12, wherein the decomposition layer is at least one selected from the group consisting a sliver ion, a zeolite and a combination thereof.

16. The method for detecting, locating and completely cleaning indoor microorganism according to claim 9, wherein the microbial second device is a filtration device removing substance by a filter screen combined with a light irradiation element.

17. The method for detecting, locating and completely cleaning indoor microorganism according to claim 16, wherein the light irradiation element is at least one selected from the group consisting of a photo-catalyst unit comprising a photo catalyst and an ultraviolet lamp, a photo-plasma unit comprising a nanometer irradiation tube and a combination thereof.

18. The method for detecting, locating and completely cleaning indoor microorganism according to claim 9, wherein the microbial second device is a filtration device removing substance by a filter screen combined with a decomposition unit.

19. The method for detecting, locating and completely cleaning indoor microorganism according to claim 18, wherein the decomposition unit is at least one selected from the group consisting of a negative ion unit, a plasma ion unit and a combination thereof.

20. The method for detecting, locating and completely cleaning indoor microorganism according to claim 3, wherein the physical first device is the microbial detection device, and the microbial detection device comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the detection of the gas detection main part, the gas detection main part detects the at least one microorganism and outputs a detection signal, and the microprocessor receives and processes the detection signal to generate microorganism data and provides the microorganism data to the communicator for a wireless communication transmission externally.

21. The method for detecting, locating and completely cleaning indoor microorganism according to claim 20, wherein the wireless communication transmission is one selected from the group consisting of a Wi-Fi communication transmission, a Bluetooth communication transmission, a radio frequency identification communication transmission and a near field communication (NFC) transmission.

22. The method for detecting, locating and completely cleaning indoor microorganism according to claim 20, wherein the gas detection main part comprises:
a base comprising:
a first surface;
a second surface opposite to the first surface;

a laser loading region hollowed out from the first surface to the second surface;

a gas-inlet groove concavely formed from the second surface and disposed adjacent to the laser loading region, wherein the gas-inlet groove comprises a gas-inlet and two lateral walls, the gas-inlet is in communication with an environment outside the base, and a transparent window is opened on the two lateral walls and is in communication with the laser loading region;

a gas-guiding-component loading region concavely formed from the second surface and in communication with the gas-inlet groove, wherein a ventilation hole penetrates a bottom surface of the gas-guiding-component loading region; and a gas-outlet groove concavely formed from the first surface, spatially corresponding to the bottom surface of the gas-guiding-component loading region, and hollowed out from the first surface to the second surface in a region where the first surface is not aligned with the gas-guiding-component loading region, wherein the gas-outlet groove is in communication with the ventilation hole, and a gas-outlet is disposed in the gas-outlet groove;

a piezoelectric actuator accommodated in the gas-guiding-component loading region;

a driving circuit board covering and attached to the second surface of the base;

a laser component positioned and disposed on the driving circuit board, electrically connected to the driving circuit board, and accommodated in the laser loading region, wherein a light beam path emitted from the laser component passes through the transparent window and extends in a direction perpendicular to the gas-inlet groove, thereby forming an orthogonal direction with the gas-inlet groove;

a particulate sensor positioned and disposed on the driving circuit board, electrically connected to the driving circuit board, and disposed at an orthogonal position where the gas-inlet groove intersects the light beam path of the laser component in the orthogonal direction, so that suspended particles contained in the microorganism passing through the gas-inlet groove and irradiated by a projecting light beam emitted from the laser component are detected;

a gas sensor positioned and disposed on the driving circuit board, electrically connected to the driving circuit board, and accommodated in the gas-outlet groove, so as to detect the microorganism introduced into the gas-outlet groove; and an outer cover covering the base and comprising a side plate, wherein the side plate has an inlet opening and an outlet opening, the inlet opening is spatially corresponding to the gas-inlet of the base, and the outlet opening is spatially corresponding to the gas-outlet of the base;

wherein the outer cover covers the base, and the driving circuit board covers the second surface, thereby an inlet path is defined by the gas-inlet groove, and an outlet path is defined by the gas-outlet groove, so that the microorganism is inhaled from the environment outside the base by the piezoelectric actuator, transported into the inlet path defined by the gas-inlet groove through the inlet opening, and passes through the particulate sensor to detect the particle concentration of the suspended particles contained in the microorganism, and the microorganism transported through the piezoelectric actuator is transported out of the outlet path defined by the gas-outlet groove through the ventilation hole, passes through the gas sensor for detecting, and then discharged through the outlet opening.

23. The method for detecting, locating and completely cleaning indoor microorganism according to claim 22, wherein the gas sensor comprises a bacteria sensor for detecting the gas information of bacteria or fungi.

24. The method for detecting, locating and completely cleaning indoor microorganism according to claim 22, wherein the gas sensor comprises a virus sensor for detecting the gas information of virus.

25. The method for detecting, locating and completely cleaning indoor microorganism according to claim 1, wherein the sterilizing substance is a microbial sterilizing substance present in a gaseous, liquid or solid state.

26. The method for detecting, locating and completely cleaning indoor microorganism according to claim 1, wherein the sterilizing substance is alcohol or sodium hypochlorite.

* * * * *